US012127995B1

(12) United States Patent
Caputo et al.

(10) Patent No.: US 12,127,995 B1
(45) Date of Patent: Oct. 29, 2024

(54) ANKLE EXOSKELETON DEVICE AND CONTROL SYSTEM

(71) Applicant: Human Motion Technologies LLC, Pittsburgh, PA (US)

(72) Inventors: Joshua M. Caputo, Pittsburgh, PA (US); Tianyao Chen, Pittsburgh, PA (US); Carl Curran, Pittsburgh, PA (US)

(73) Assignee: Human Motion Technologies LLC, Pittsburgh, PA (US)

( * ) Notice: Subject to any disclaimer, the term of this patent is extended or adjusted under 35 U.S.C. 154(b) by 495 days.

(21) Appl. No.: 17/104,445

(22) Filed: Nov. 25, 2020

Related U.S. Application Data

(60) Provisional application No. 62/941,044, filed on Nov. 27, 2019.

(51) Int. Cl.
*A61H 3/00* (2006.01)

(52) U.S. Cl.
CPC ........... *A61H 3/00* (2013.01); *A61H 2201/12* (2013.01); *A61H 2201/1642* (2013.01); *A61H 2201/165* (2013.01); *A61H 2201/5061* (2013.01); *A61H 2201/5069* (2013.01); *A61H 2230/625* (2013.01)

(58) Field of Classification Search
CPC .................. A61H 3/00; A61H 2201/12; A61H 2201/1642; A61H 2201/165; A61H 2201/5061; A61H 2201/5069; A61H 2230/625
See application file for complete search history.

(56) References Cited

U.S. PATENT DOCUMENTS

| | | | | |
|---|---|---|---|---|
| 2015/0265425 | A1* | 9/2015 | Aagaah | A61F 2/80 623/47 |
| 2018/0125738 | A1* | 5/2018 | Witte | A61B 5/1038 |
| 2019/0015287 | A1* | 1/2019 | Witte | A61H 3/00 |
| 2020/0046132 | A1* | 2/2020 | Gunura | F16C 1/106 |
| 2020/0188214 | A1* | 6/2020 | Lee | A61H 1/0262 |
| 2021/0228430 | A1* | 7/2021 | Farris | A61H 1/0244 |

* cited by examiner

*Primary Examiner* — Jerrah Edwards
*Assistant Examiner* — Aren Patel
(74) *Attorney, Agent, or Firm* — K&L Gates LLP

(57) ABSTRACT

An exoskeleton device is disclosed. The exoskeleton device comprises a Bowden cable, a shank portion comprising a strut, and a foot portion coupled to the shank portion by a rotational joint. The foot portion comprises a heel lever and a pulley attached to the heel lever, wherein the strut of the shank portion is configured to redirect the Bowden cable toward the pulley, wherein the pulley is configured to redirect the Bowden cable back toward the shank portion, and wherein the Bowden cable is configured to generate torque by pulling the pulley. The exoskeleton device further comprises a midsole, wherein the midsole is releasably coupled to the lever, and wherein the midsole is configured to transmit force to a foot of a user.

20 Claims, 30 Drawing Sheets

A Torque Measurement Accuracy

760

1200

ANKLE EXOSKELETON DEVICE AND CONTROL SYSTEM

CROSS-REFERENCE TO RELATED APPLICATIONS

The present application claims priority under 35 U.S.C. § 119(e) to U.S. Provisional Patent Application Ser. No. 62/941,044, titled ANKLE EXOSKELETON AND CONTROL SYSTEM, filed Nov. 27, 2019, the disclosure of which is herein incorporated by reference in its entirety.

The present application is related to U.S. patent application Ser. No. 15/605,313, filed on May 25, 2017, entitled EXOSKELETON DEVICE AND CONTROL SYSTEM, published as U.S. Publication No. 2018/0125738, which is hereby incorporated by reference in its entirety.

BACKGROUND

Lower-limb exoskeletons have the potential to aid in rehabilitation, assist walking for those with gait impairments, reduce the metabolic cost of normal and load-bearing walking, improve stability, and probe interesting questions about human locomotion. The challenges of designing effective lower-limb exoskeletons may be simplified by focusing on a single joint. During normal walking, the ankle produces a larger peak torque and performs more positive work than either the knee or the hip. The ankle joint may therefore prove an effective location for application of assistance.

Many exoskeletons have been developed employing different approaches to mechanical design, actuation, and control. Though the most effective mechanical method to assist the ankle remains unclear, the process of designing and testing our devices has produced several guiding principles for exoskeleton design.

Delivering positive work with an exoskeleton by supplying ankle plantar flexor torques can reduce the metabolic energy cost of normal and load bearing walking. Increasing the amount of work supplied by the device results in a downward trend in metabolic energy cost. The ankle joint experiences a wide range of velocities during normal walking, with plantarflexion occurring rapidly. The ability to apply large torques and do work therefore enriches the space of potential assistance techniques, and allows the device to keep up with natural movements of the user. Independent of maximum torque, the system's responsiveness to changes in desired torque is important. For example, the timing of torque application in the gait cycle strongly affects metabolic energy consumption.

Effective design of exoskeletons requires an understanding of human-device interaction. The device must be able to transfer loads comfortably, quickly, effectively, and safely. Shear forces cause discomfort when interfacing with skin. Applying forces normal to the human over large surface areas allows for greater magnitudes of applied force while maintaining comfort. Applying forces far from the ankle joint, thereby increasing the lever arm, reduces the magnitude of applied force necessary for a desired externally applied ankle torque. Series elasticity improves torque control and decouples the human from the inertia of the motor and gearbox. The stiffness of the spring also determines the nominal behavior of the device, or the torque profile produced when the motor position is held constant while ankle angle changes. The optimal stiffness is not known a priori as it may vary across subjects and applications, and experiments should be performed to determine the appropriate spring stiffness. The system accounts for comfort and how the system changes with human interaction. While an exoskeleton may have high torque and bandwidth capabilities on a test stand, results may change when a human is included in the system.

Many ankle exoskeletons are designed to reduce metabolic energy cost. Placing an ankle exoskeleton on the leg, however, automatically incurs a metabolic energy penalty because it adds distal mass. Reducing total device mass helps decrease this penalty. Ankle exoskeletons also interfere with natural motion and, although this problem can be partially addressed by good control, some interference is unavoidable due to the physical structure of the device. Maintaining compliance in uncontrolled directions, such as inversion and eversion, allows for less inhibited motion. Reducing the overall device envelope, especially the width, decreases additional metabolic energy costs associated with increased step width. Users may vary greatly in anthropometry, such as body mass and leg length. Rather than designing a new device for each user, which is time-consuming and expensive, incorporating adjustability or modularity allows a single exoskeleton to be used on multiple subjects.

Human locomotion is a versatile and complex behavior that remains poorly understood, and designing devices to interact usefully with humans during walking is a difficult task. Building adjustable devices to supply a wide range of torques using numerous control schemes provides freedom to rapidly and inexpensively measure the human response to different strategies. Results from human experiments can provide insights into useful capabilities for future designs.

SUMMARY

Lower-limb exoskeletons capable of comfortably applying high torques at high bandwidth can be used to probe the human neuromuscular system and assist gait. Various exoskeleton devices are disclosed herein. In various instances, the exoskeleton device comprises a Bowden cable, a shank portion comprising a strut, and a foot portion coupled to the shank portion by a rotational joint. The foot portion comprises a lever and a pulley attached to the lever, wherein the strut of the shank portion is configured to redirect the Bowden cable toward the pulley, wherein the pulley is configured to redirect the Bowden cable back toward the shank portion, and wherein the Bowden cable is configured to generate torque by pulling the pulley. The exoskeleton device further comprises an enforced midsole plate, wherein the enforced midsole plate is releasably coupled to the lever, and wherein the enforced midsole plate is configured to transmit force to a foot of a user. The exoskeleton device further comprises a load cell configured to detect a parameter of the exoskeleton device, a motor controller configured to receive the detected parameter from the load cell, and a motor communicatively coupled to the motor controller, wherein the motor is configured to cause the Bowden cable to provide torque about the rotational joint in response to a motor control signal sent by the motor controller.

BRIEF DESCRIPTION OF THE DRAWINGS

Various features of the embodiments described herein are set forth with particularity in the appended claims. The various embodiments, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

Figure 1:
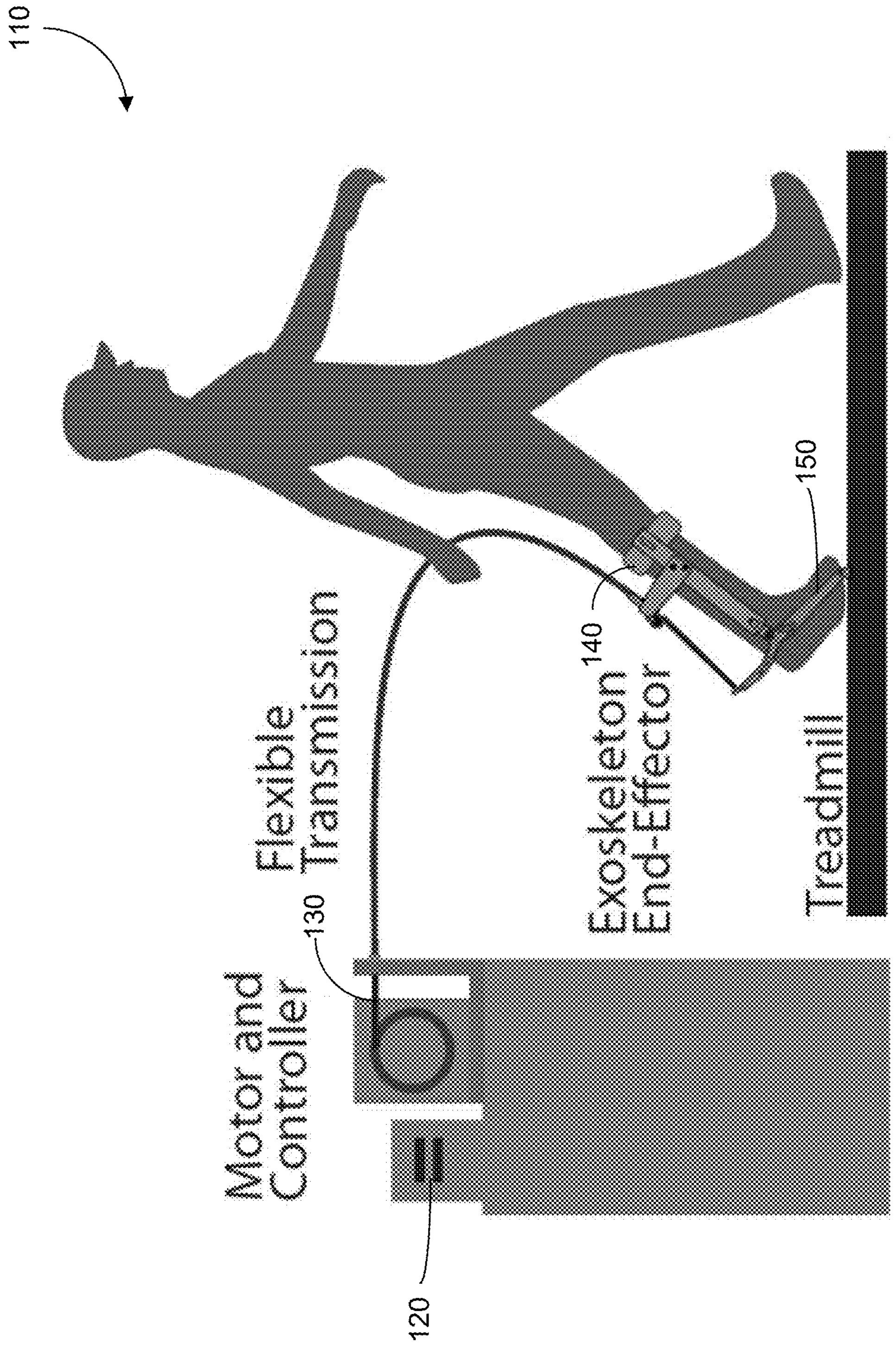
FIG. 1 shows an example exoskeleton device and system for using the exoskeleton device.

This document describes the design and testing of ankle exoskeletons to be used as end-effectors in a tethered emulator system (e.g., as seen in FIG. 1). This document discusses approaches to exoskeleton design, including fabrication of strong, lightweight components, implementation of series elasticity for improved torque control, and comfortable interfacing that reduces restriction of natural movement.

FIG. 1 shows an example exoskeleton emulator system 110 and exoskeleton end-effectors. A testbed includes an off-board motor 130 and a motor controller 120, a flexible transmission cable 140, and an ankle exoskeleton end-effector 150 that can be worn on a user's leg. The exoskeleton end-effector 150 is described in further detail win respect to FIGS. 2-3, below. The motor 130 is configured to provide a tension to the cable 140 that attaches to the exoskeleton end-effector 150. The tension applied to the cable 140 applies torque to a joint (not shown) of the exoskeleton end-effector 150. The torque applied to the exoskeleton end-effector 150 assists the user ankle motions as described below. The motor 130 is controlled by the motor controller 120, which receives data from the one or more sensors (e.g., torque sensors, not shown) that are attached to the exoskeleton end-effector 150. The motor controller 120 uses the data that is received to control the motor 130 to apply tension to the cable 140 at specific times and thus apply torque to the joint of the exoskeleton end-effector 150 and assist the user. More detail for controlling the torque applied to the exoskeleton device can be found in Zhang, J., Cheah, C. C., and Collins, S. H. (2017) *Torque Control in Legged Locomotion, Bio-Inspired Legged Locomotion: Concepts, Control and Implementation*, eds. Sharbafi, M., Seyfarth, A., Elsevier, incorporated herein in entirety.

Figure 2:
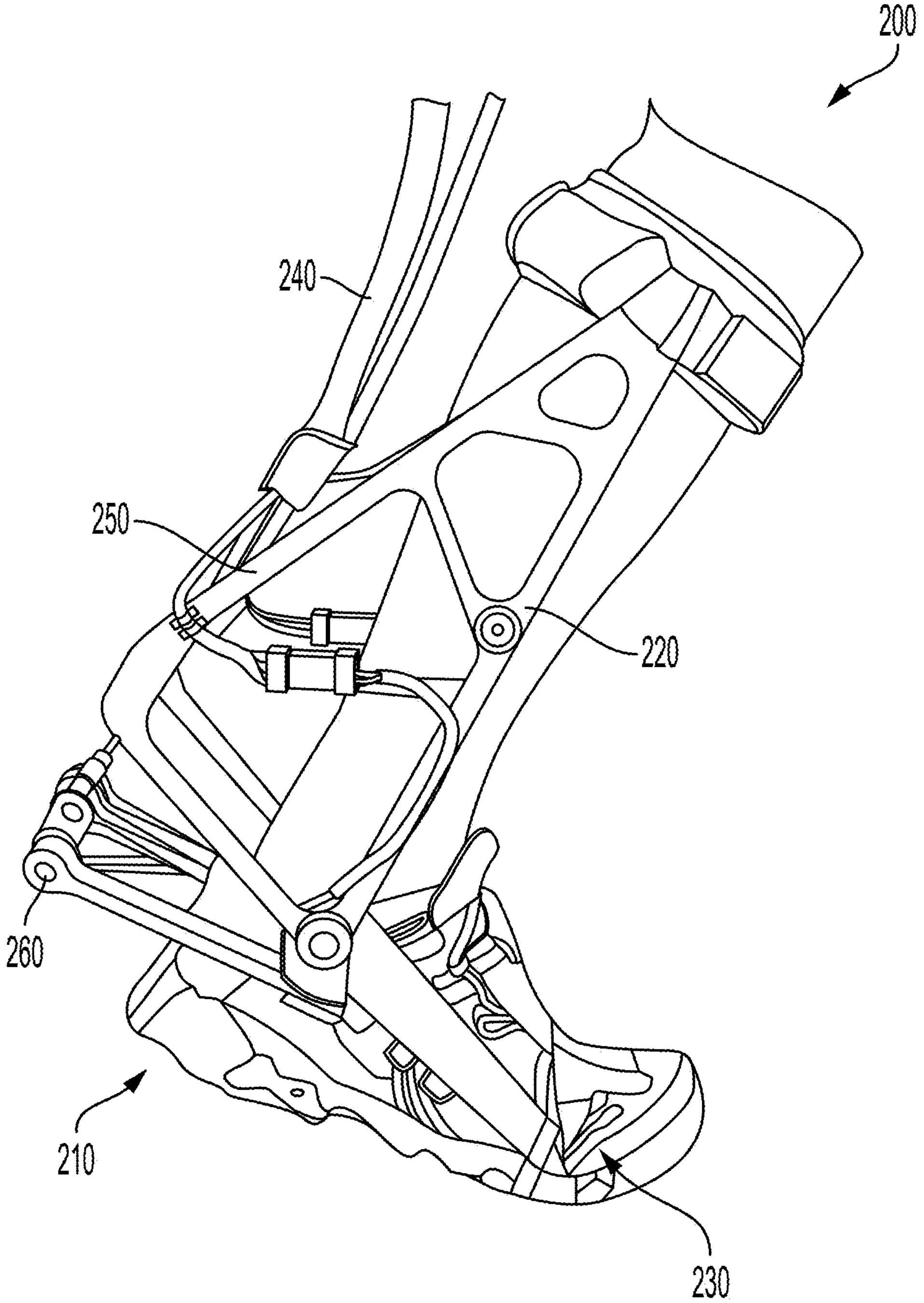
FIG. 2 shows an example exoskeleton device.
Figure 3:
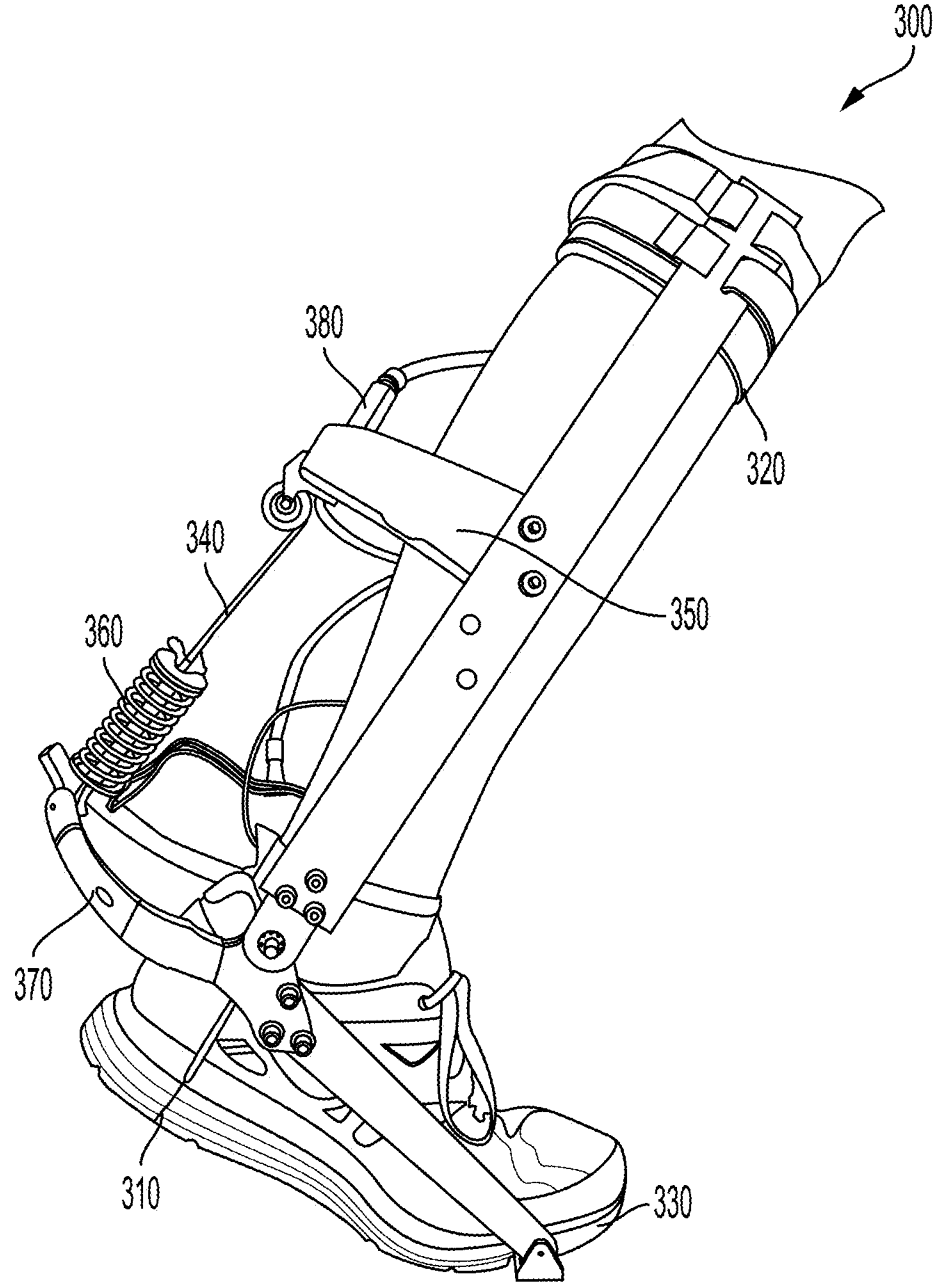
FIG. 3 shows an example exoskeleton device.

FIG. 2 shows an example exoskeleton 200 (e.g., the Alpha exoskeleton, the Alpha device, the Alpha design etc.). The exoskeleton 200 contacts the heel 210 using a string. The exoskeleton contacts the shin using a strap 220. The exoskeleton contacts the ground using a hinged plate 230 embedded in the shoe. The Bowden cable 240 conduit attaches to the shank frame 250, while the Bowden cable 240 terminates at the spring 260. FIG. 3 shows an example exoskeleton 300 (e.g., the Beta exoskeleton, the Beta design, the Beta device, etc.). The exoskeleton 300 contacts the heel 310 using a string, the shin using a strap 320, and the ground using a hinged plate 330 embedded in the shoe. The Bowden cable 340 conduit attaches to the shank frame 350, while the Bowden cable 340 terminates at a series spring 360. A titanium ankle lever 370 wraps behind the heel. This exoskeleton 300 also includes a hollow carbon fiber Bowden cable support 380. The Alpha exoskeleton provides compliance in selected directions, such as yaw and roll directions for the ankle. The Beta exoskeleton includes a smaller volume envelope than the Alpha design.

The ankle exoskeleton end-effectors (e.g., exoskeletons 200, 300) were actuated by a powerful off-board motor and real-time controller, with mechanical power transmitted through a flexible Bowden cable tether. The motor, controller and tether elements of this system are described in detail in J. M. Caputo and S. H. Collins, *A Universal Ankle-Foot Prosthesis Emulator for Experiments During Human Locomotion*, J. Biomech. Eng. vol. 136, p. 035002, 2014 (hereinafter Caputo), incorporated herein in entirety.

Both exoskeletons 200, 300 interface with the foot under the heel, the shin below the knee, and the ground beneath the toe. The exoskeleton frames include rotational joints on either side of the ankle, with axes of rotation approximately collinear with that of the human joint.

Each exoskeleton device 200, 300 can be separated into foot and shank sections. The foot section has a lever arm posterior to the ankle that wraps around the heel. The Bowden cable pulls up on this lever while the Bowden cable conduit presses down on the shank section. This results in an upward force beneath the user's heel, a normal force on the top of the shin, and a downward force on the ground, generating a plantarflexion torque (e.g., as shown in FIG. 2). The toe and shin attachment points are located far from the ankle joint, maximizing their leverage about the ankle and minimizing forces applied to the user for a given plantarflexion torque. Forces are comfortably transmitted to the shin via a padded strap, which is situated above the calf muscle to prevent the device from slipping down. Forces are transmitted to the user's heel via a lightweight synthetic rope placed in a groove in the sole of a running shoe.

Figure 4A:
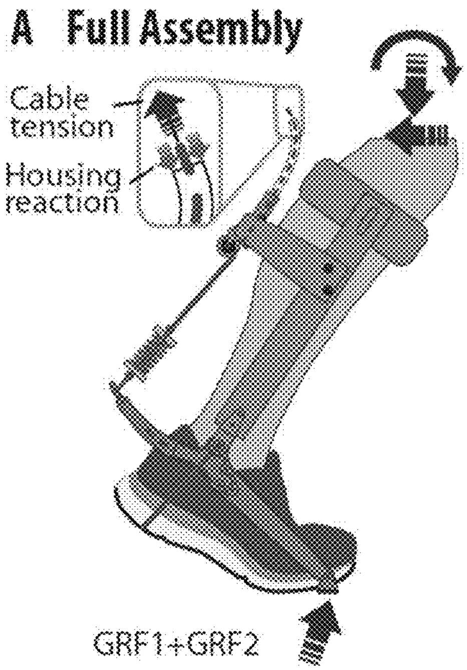
FIGS. 4A-4D each show diagrams of forces on elements of the exoskeleton device.
Figure 4B:
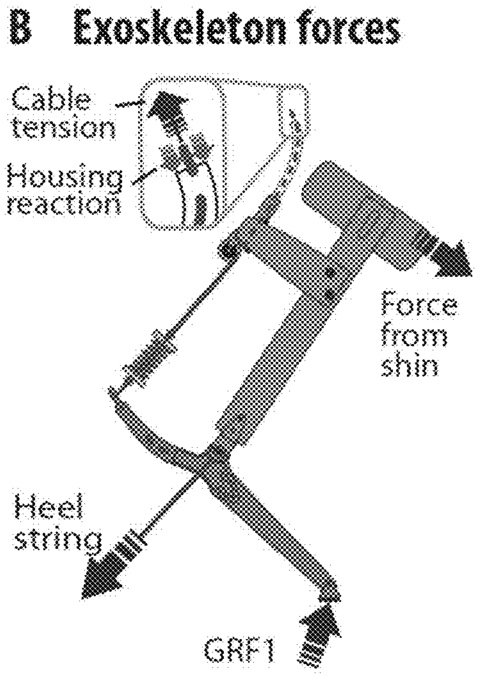
Figure 4C:
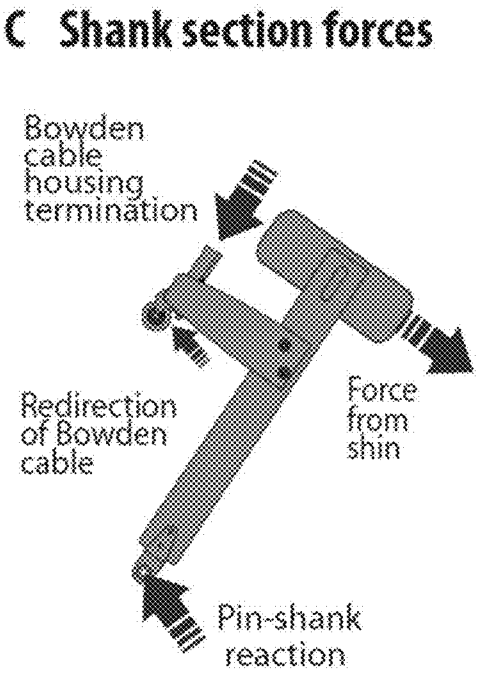
Figure 4D:
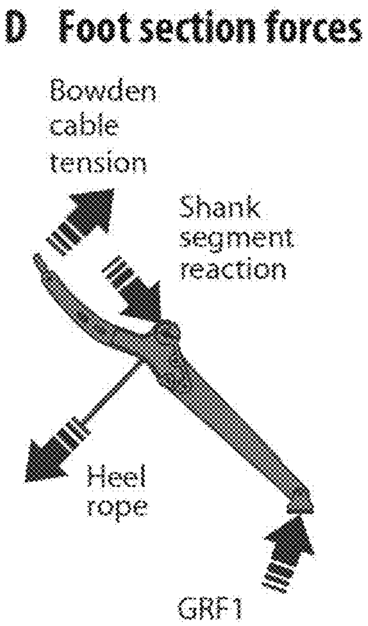

FIGS. 4A-4D each show free body diagrams of the exoskeleton structure. In FIG. 4A, the complete exoskeleton experiences external loads at the three attachment points, which together create an ankle plantarflexion torque. Forces in the Bowden cable conduit and inner rope (inset) are equal and opposite, producing no net external load on the leg. FIG. 4B shows a free body diagram depicting forces on the shank component of the exoskeleton devices 200, 300. FIG. 4C shows a free body diagram depicting loading of the foot component of the exoskeleton devices 200, 300. FIG. 4D shows a free body diagram depicting forces on the shaft and cable of exoskeletons 200, 300. The exoskeletons 200, 300 provide greater peak torque, peak velocity and range of motion than observed at the ankle during unaided fast walking. The Alpha and Beta devices can withstand peak plantarflexion torques of 120 N-m and 150 N-m respectively. The expected peak plantarflexion velocities, limited by motor speed, of the Alpha and Beta devices are 300 and 303 degrees per second, respectively. Both devices have a range of motion of 30° plantarflexion to 20° dorsiflexion, with 0° corresponding to a natural standing. In some implementations, the rotational speed is up to 1000 degrees per second.

Both exoskeletons are modular to accommodate a range of subject sizes. Toe struts, calf struts, and heel strings can be exchanged to fit different foot and shank sizes. Current hardware fits users with shank lengths ranging from 0.42-0.50 meters and shoe sizes ranging from a women's size 7 to a men's size 12 (U.S.). Slots in the calf struts allow an additional 0.04 m of continuous adjustability in the Beta device. Series elasticity is provided by a pair of leaf springs in the Alpha design. The custom leaf springs include fiberglass (GC-67-UB, Gordon Composites, Montrose, Colo., USA), which has a mass per unit strain-energy storage, ρEσy-2, one eighth that of spring steel. The leaf springs also function as the ankle lever in the Alpha exoskeleton, thereby reducing the number of components required. A coil spring (DWC-225M-13, Diamond Wire Spring Co., Pittsburgh, Pa., USA) is included in the Beta design. The lever arm and joint assembly of the Alpha device was lighter by 0.059 kg compared to the Beta design, but this comparison is confounded by factors such as different maximum expected loads and spring stiffness.

Figure 5:
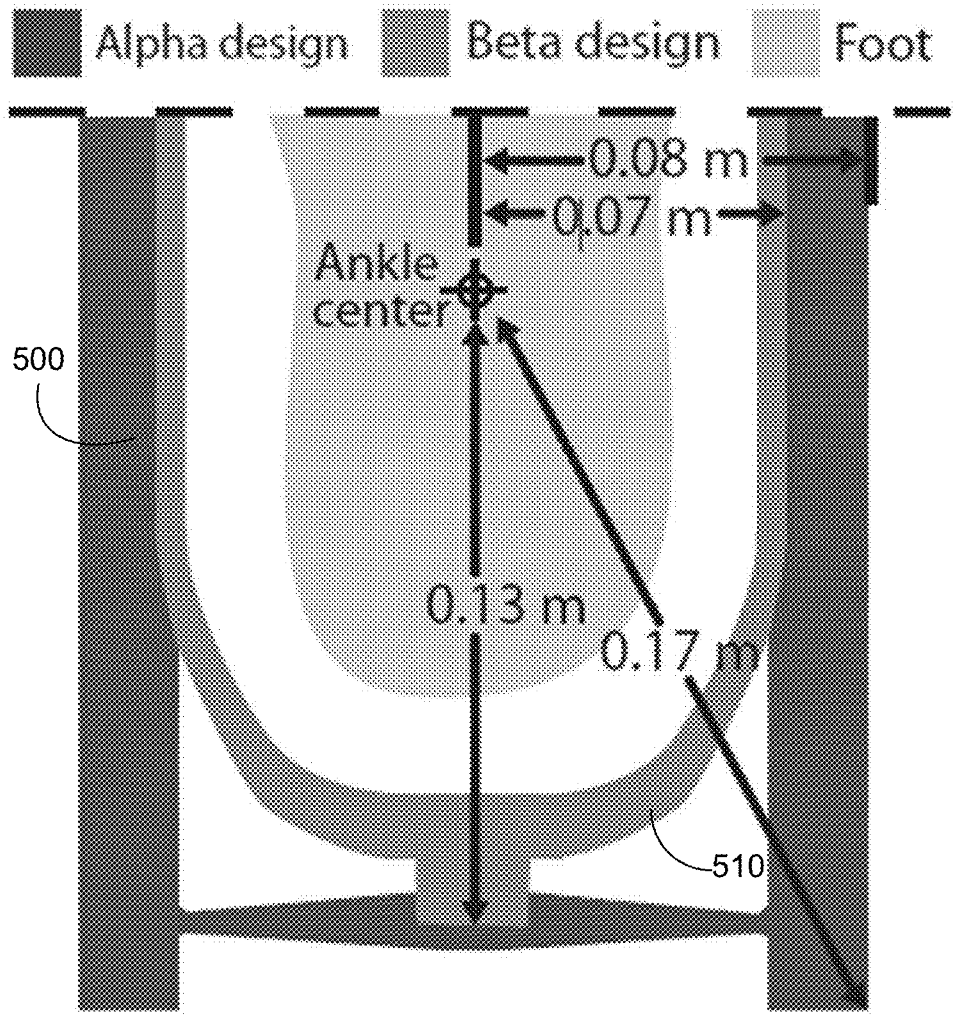
FIG. 5 shows a comparison of envelopes of example exoskeleton devices including rotational joints.

Spring type strongly affects the overall exoskeleton envelope. The structure of the Alpha device extends substantially into space medial and posterior to the ankle joint (e.g., as seen in FIG. 5). This large envelope increased user step width, potentially increasing metabolic energy consumption during walking, and caused occasional collisions with the contralateral limb. The average maximal ankle external rotation during walking for healthy subjects is approximately 18°, and the average step width is only 0.1 m. For this reason, the Beta exoskeleton reduces medial and lateral protrusions to prevent collisions and excessive widening of step width during bilateral use. The maximum protrusion length measured from the center of the human ankle joint is 24% smaller than that of the Alpha design.

FIG. 5 shows a comparison of envelopes of the exoskeleton devices 200, 300, depicted from above, including rotational joints 500, 510. The Beta exoskeleton 300 is slimmer in terms of medial-lateral protrusion and maximum protrusion from the joint center. The Alpha design's plate-like components are more easily machined relative to the Beta design's rotational joint, while more complex Beta components are suited to additive manufacturing and lost-wax carbon fiber molding. The Beta exoskeleton 300 originally featured a leaf spring extending from the ankle lever. Due to this configuration, the lever experienced large bending and torsion loads, well addressed by I-beam and tubular structures. The ankle lever also required small, precise features for connection to the ankle shaft and toe hardware. Additive manufacturing using electron sintering of titanium allowed these disparate design requirements to be addressed by a single component. The titanium component weighed 0.098 kg less than an equivalent structure from an earlier prototype comprised of a carbon fiber ankle lever, two aluminum joint components, a fiberglass leaf spring, and connective hardware. The Beta Bowden cable termination support is subjected to similar loading as the ankle lever, but has Jess complex connection geometry, making a hollow carbon fiber structure appropriate. This part was manufactured using a lost wax molding method. A wax form with a threaded aluminum insert was cast using a fused deposition ABS shell-mold. A composite layup was performed on the wax form using braided carbon fiber sleeves. The wax was melted out by submerging the component in warm water. In an earlier prototype, the carbon fiber layup was performed on a hollow plastic mold, reinforced to withstand the vacuum bagging process. The permanent plastic mold adds approximately 0.048 kg to the component.

Both exoskeleton designs provide some structural compliance. Thin plate-like shank struts act as flexures, allowing the calf strap to fit snugly around a wide range of calf sizes and move medially and laterally. This flexural compliance, in concert with sliding of the calf strap on the struts, sliding of the rope beneath the heel, and compliance in the shoe, allows ankle rotation in both roll and yaw during walking. The Bowden cable support connecting the medial and lateral shank struts is located lower and further back from the leg in the Alpha design, allowing more deflection at the top of the struts. The Bowden cable support is located higher in the Beta design to allow space for the in-line coil spring, which reduces compliance near the calf strap and makes additional spacers necessary to appropriately fit smaller calves.

Both exoskeletons 200, 300 are configured to sense ankle angle with optical encoders (e.g., E4P and E5, respectively, US Digital Corp., Vancouver, Wash., USA) and foot contact with switches (e.g., 7692K3, McMaster-Carr, Cleveland, Ohio, USA) in the heel of the shoe. The Alpha exoskeleton uses a load cell (e.g., LC201, Omega Engineering Inc., Stamford, Conn., USA) to measure Bowden cable tension. The Beta exoskeleton uses four strain gauges (e.g., MMF003129, Micro Measurements, Wendell, N.C., USA) in a Wheatstone bridge (or variant thereof) on the ankle lever to measure torque directly. A conventional Wheatstone Bridge configuration can be used, such as described in http://en.wikipedia.org/wiki/Wheatstone_Bridge. Bridge voltage was sampled at 5000 Hz and low-pass filtered at 200 Hz to reduce the effects of electromagnetic interference. A combination of classical feedback control and iterative learning was used to control exoskeleton torque during walking. Proportional control with damping injection was used in closed-loop bandwidth tests. This approach is described in detail in J. Zhang, C. C. Cheah, and S. H. Collins, *Experimental Comparison of Torque Control Methods on an Ankle Exoskeleton During Human Walking, Proc. Int. Conf Rob. Autom.,* 2015. For walking tests, desired torque is computed as a function of ankle angle and gait cycle phase. During stance, desired torque roughly matched the average torque-angle relationship of the ankle during normal walking (using a control method described in detail in Caputo). During swing, a small amount of slack was maintained in the Bowden cable, resulting in no torque.

Torque sensors are calibrated by removing and securing the ankle lever upside down in a jig. Torque can be incrementally increased by hanging weights of known mass from the Bowden cable. A root mean squared (RMS) error between applied and measured torque from the calibration set can be computed for calibration.

Figure 6:
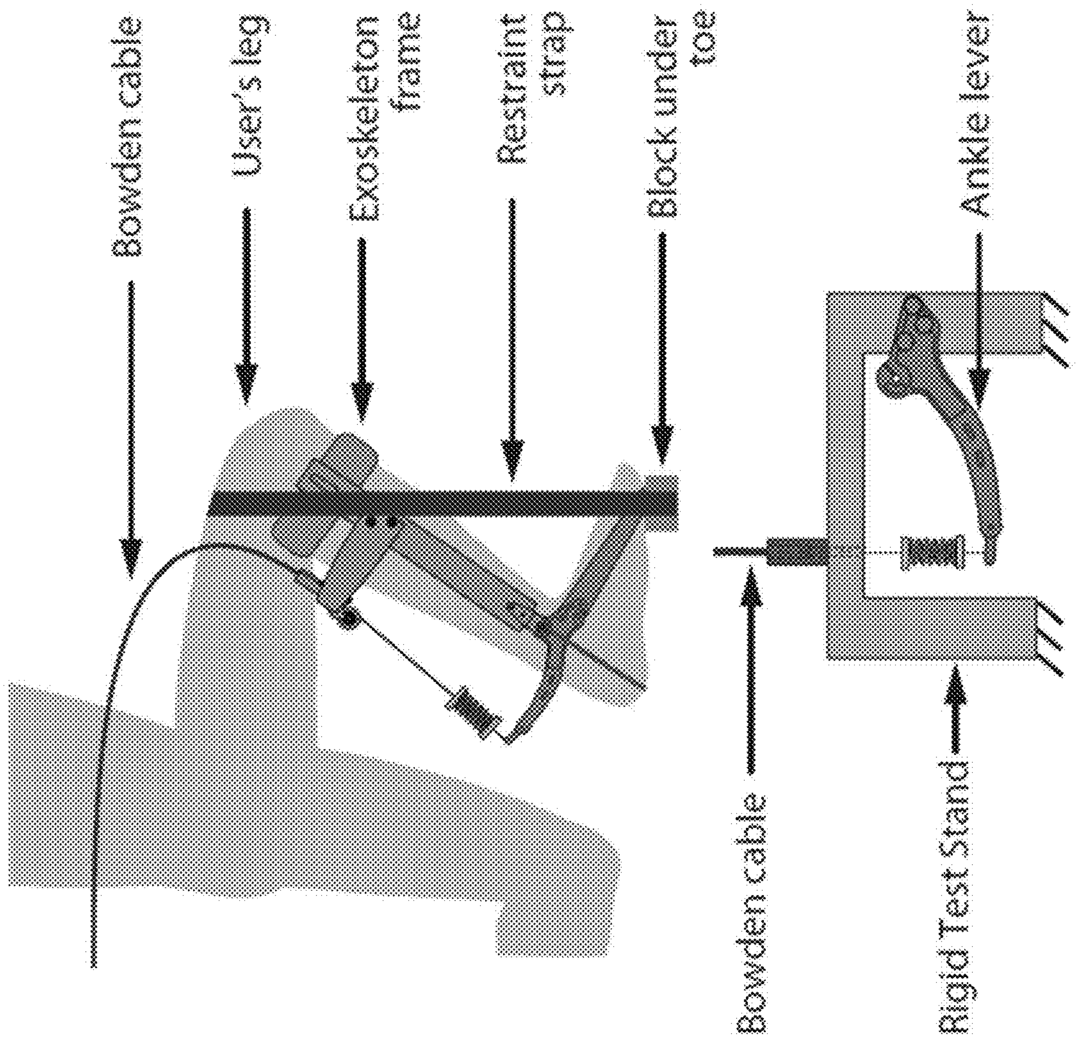
FIG. 6 shows an example exoskeleton device.

FIG. 6 shows an example exoskeleton device (e.g., exoskeleton devices 200, 300) during testing. Closed-loop torque bandwidth tests are performed on the ankle exoskeleton while worn by a user to capture the effects of soft tissues and compliance in the shoe on torque control. The user's ankle was restrained by a strap that ran under the toe and over the knee. Linear chirps in desired torque are applied with a maximum frequency of 30 Hz over a 30 second period, and measured torque is recorded. Bode frequency response plots are generated using the Fourier transform of desired and measured torque signals. In some implementations, ten tests are performed at amplitudes of 20 and 50 N-m, and results are averaged. Bandwidth can be calculated as the lesser of the −3 dB cutoff frequency and the 30° phase margin crossover frequency. Torque tracking performance can be evaluated during walking trials with a single healthy subject (e.g., 1.85 m, 77 Kg, 35 years old, male). Data was collected over 100 steady-state steps while walking on a treadmill at 1.25 meters per second. RMS error was calculated over the entire trial and for an average step.

The total mass of the Alpha and Beta exoskeletons are approximately 0.835 and 0.875 kg, respectively (Table 1, below). Torque measurement accuracy tests showed a RMS error of 0.751 N-m and 0.125 N-m for Alpha and Beta respectively.

TABLE 1

| MASS BREAKDOWN (KG) | | |
|---|---|---|
| Assembly | Alpha | Beta |
| Lever Arm, Spring and Joint | 0.256 | 0.315 |
| Struts and Bowden Cable Support | 0.258 | 0.312 |
| Toe Plates | 0.154 | 0.074 |
| Straps | 0.063 | 0.120 |
| Wiring and Sensors | 0.104 | 0.054 |
| Total | 0.835 | 0.875 |

Figure 7A:
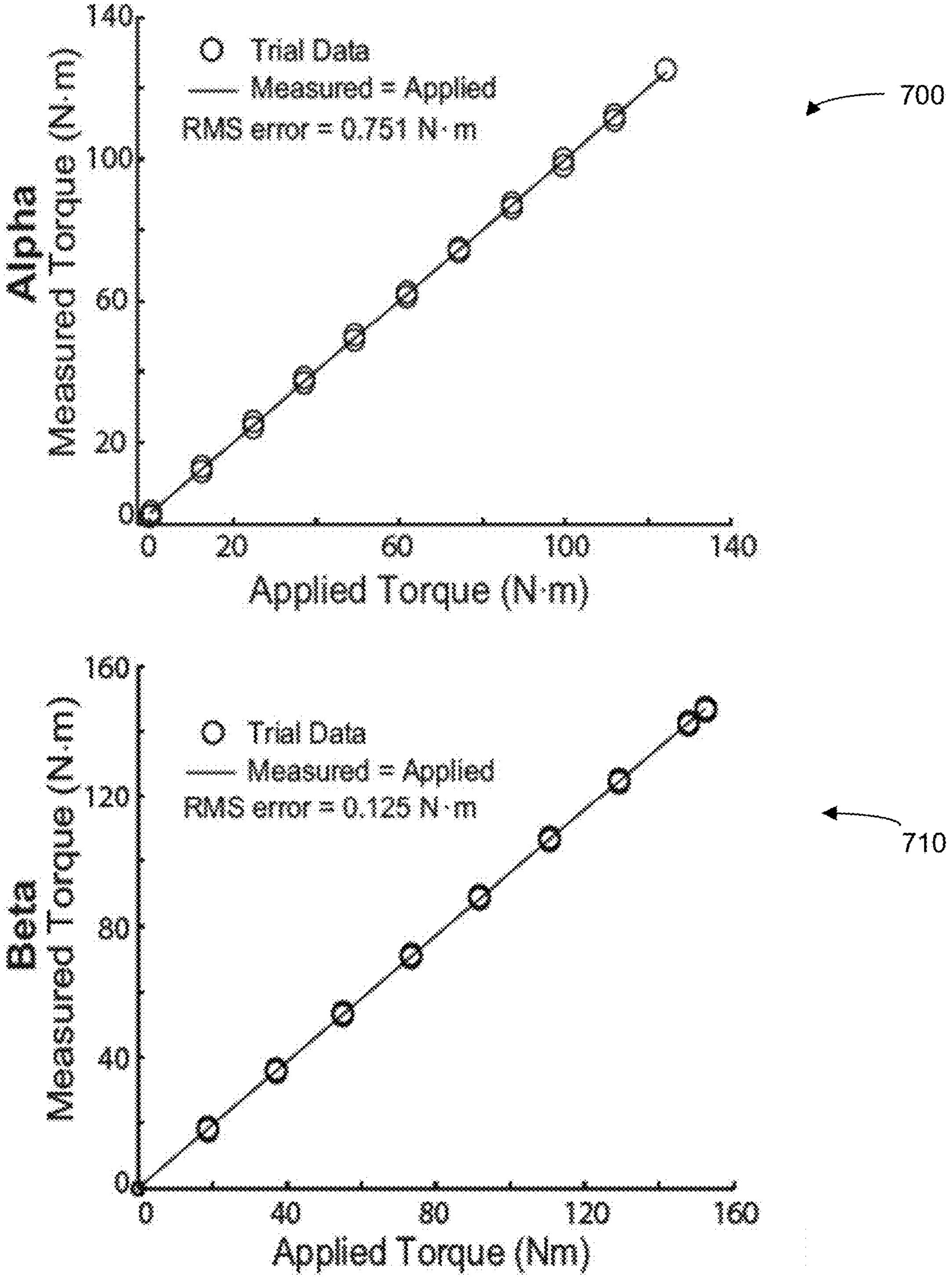
FIGS. 7A-7E show example testing results data.
Figure 7B:
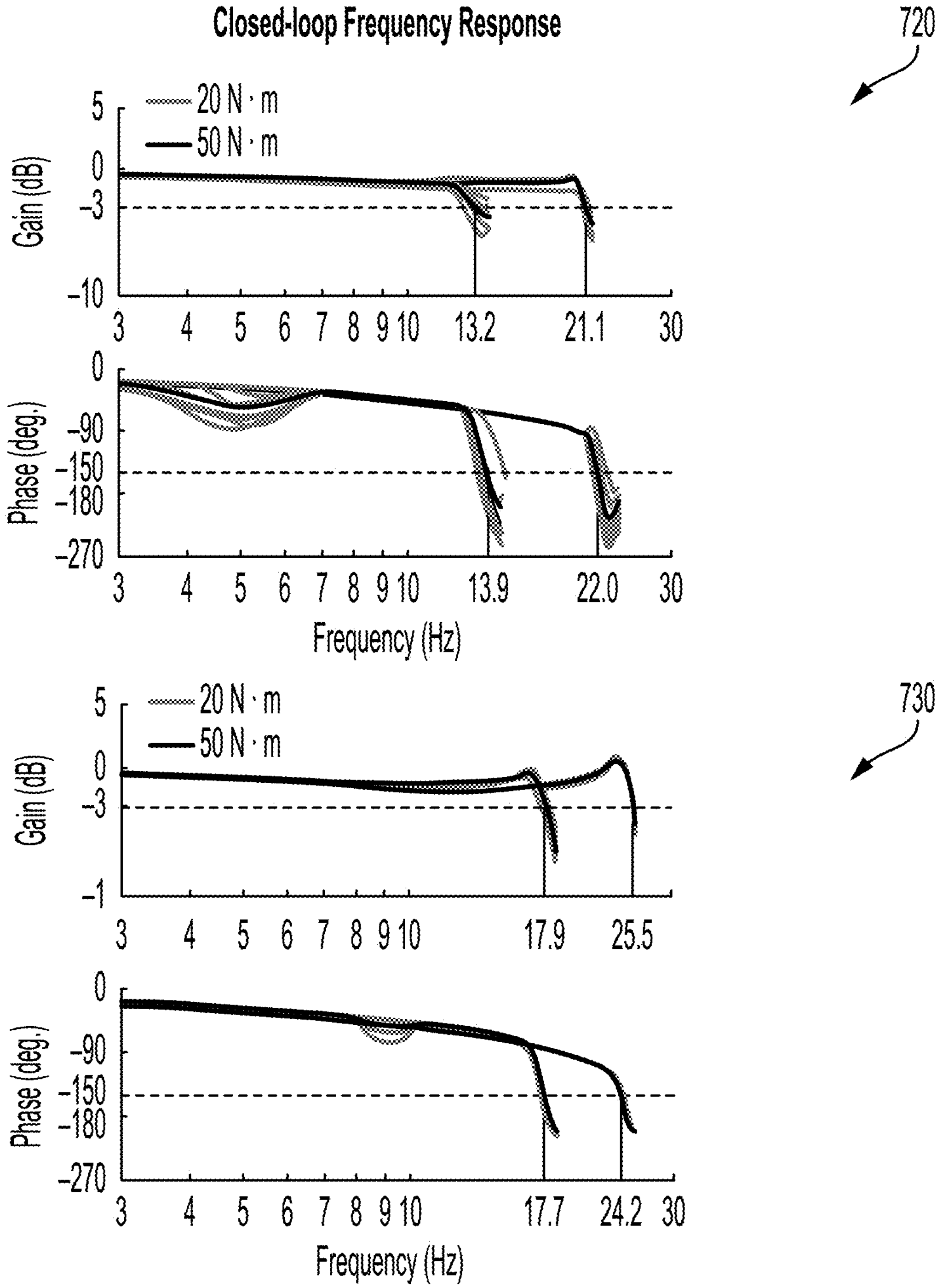
Figure 7C:
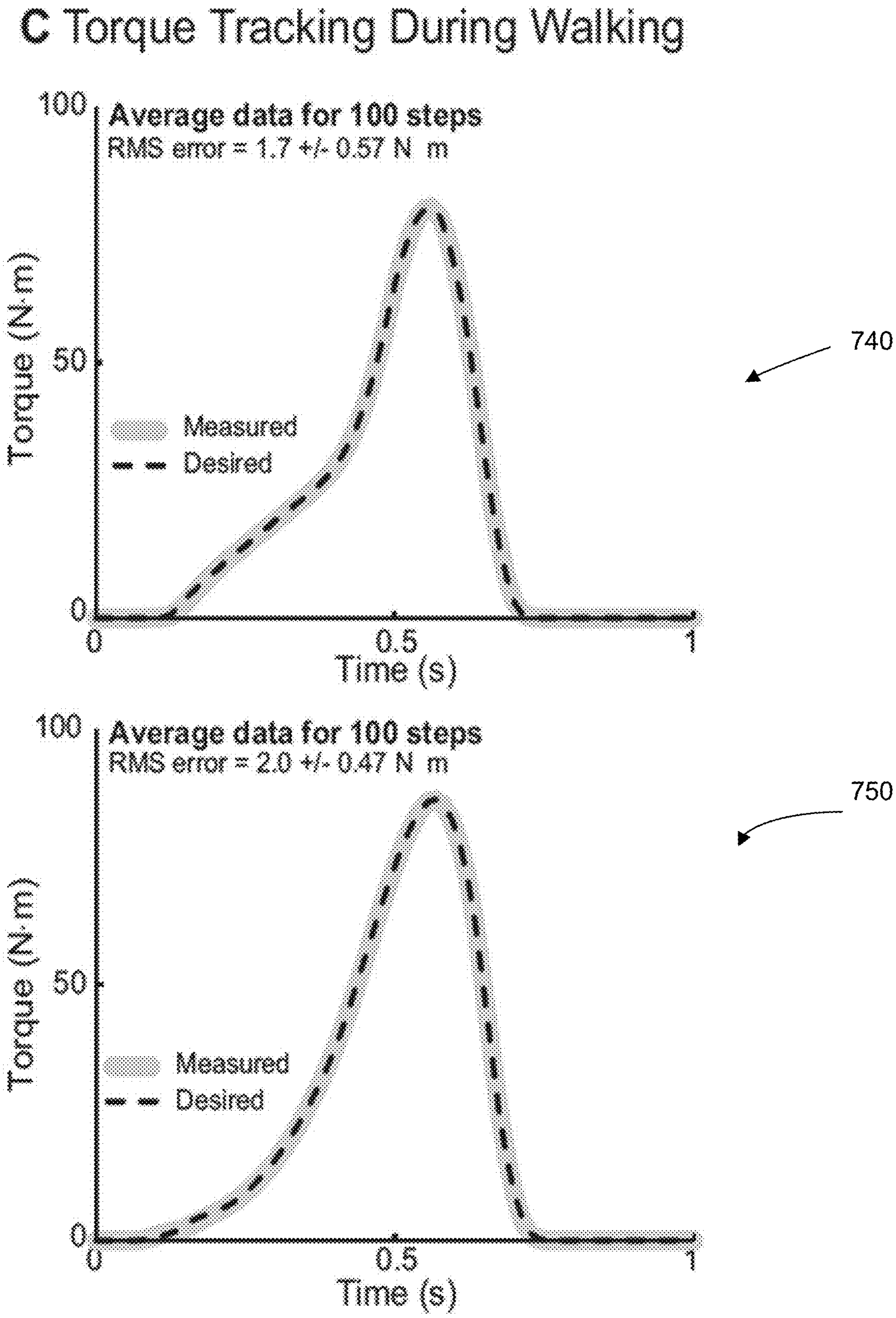
Figure 7D:
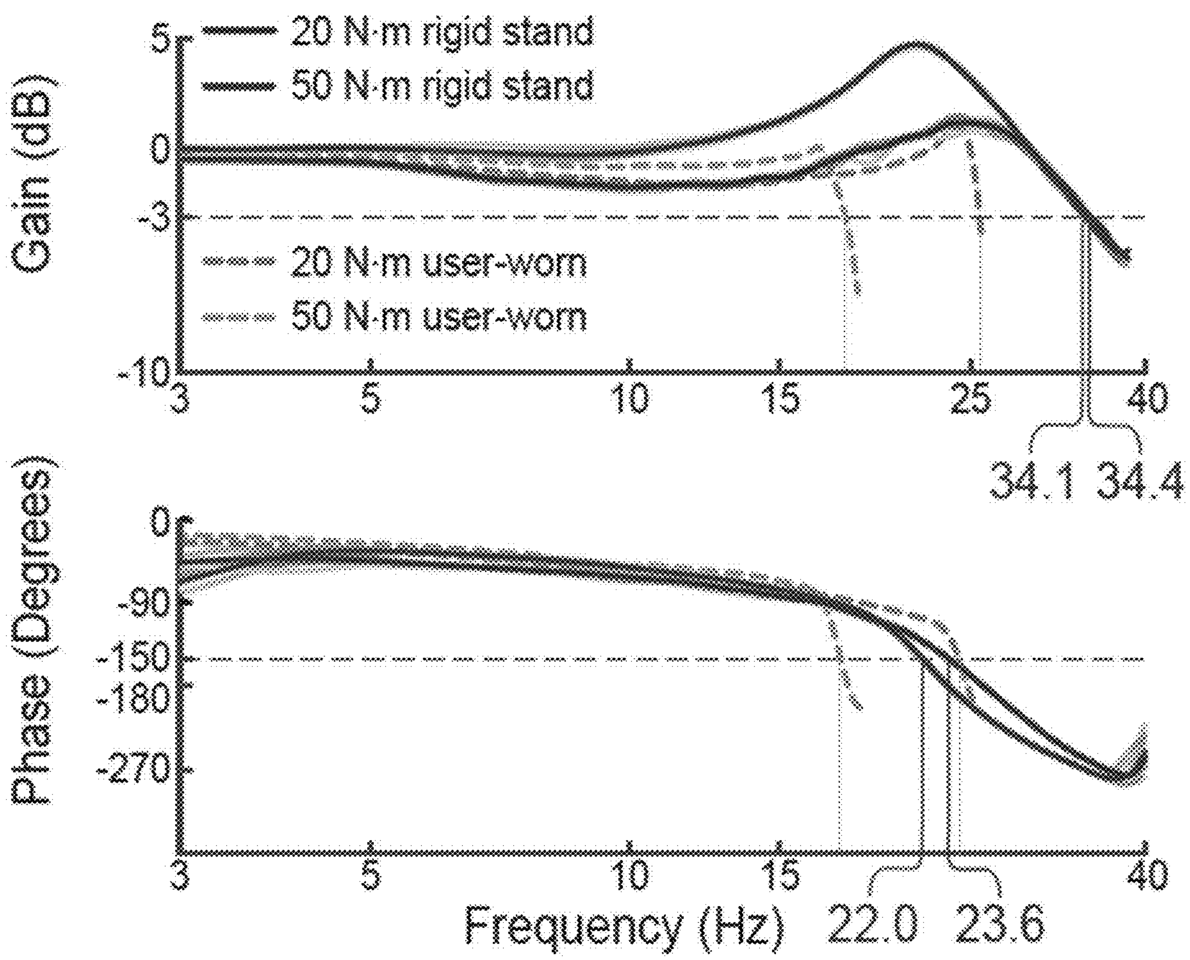
Figure 7E:
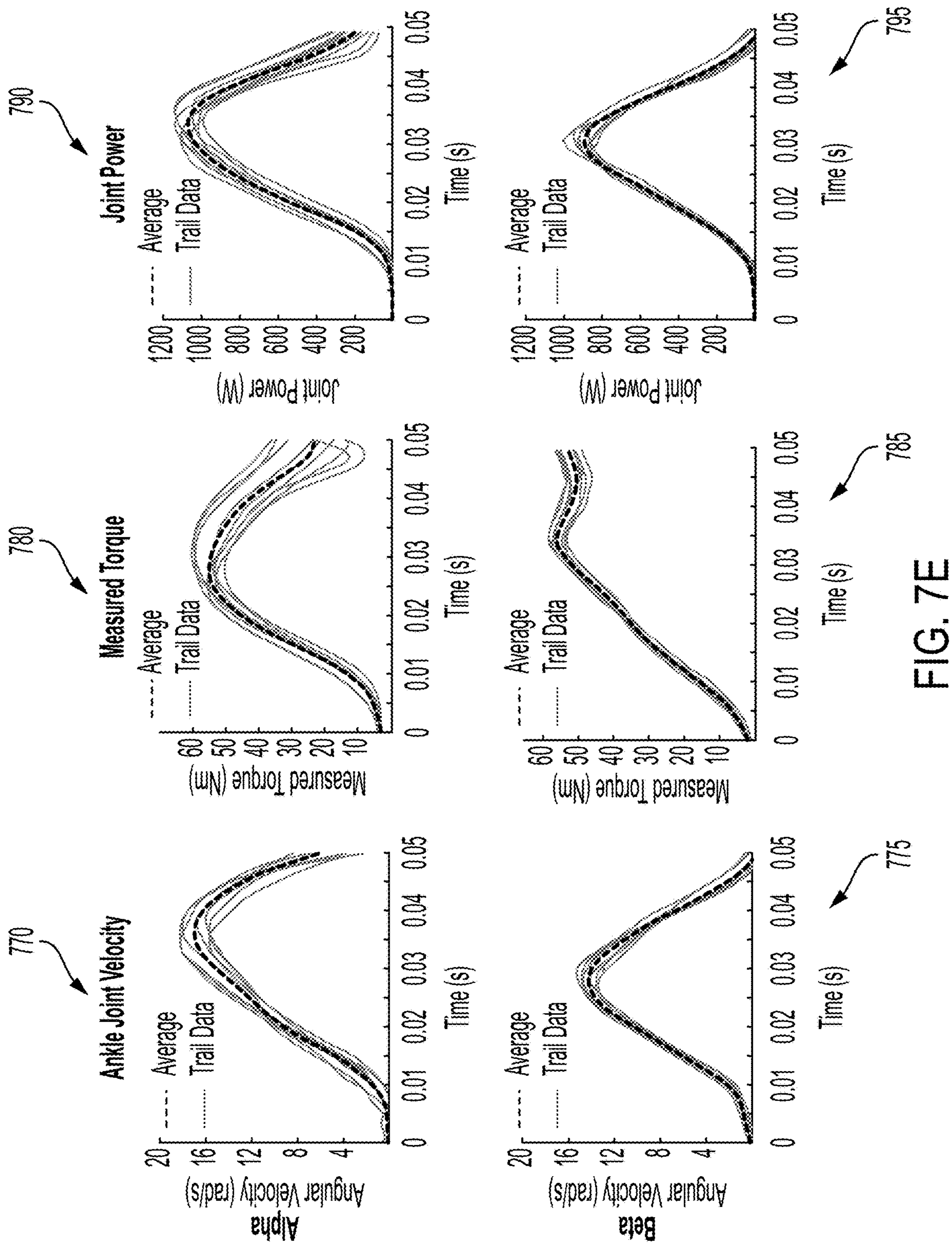

FIGS. 7A-7E show results from tests of the Alpha and Beta exoskeleton devices 200, 300. Graphs 700, 710 of FIG. 7A each show torque measurement calibration results. Graphs 720, 730 of FIG. 7B each show Bode plots depicting frequency response of the system with peak desired torques of 20 N-m and 50 N-m. Bandwidth was gain-limited for the Alpha device and phase-limited with the Beta device. Graphs 730, 740 of FIG. 7C each show average desired and measured torque from 100 steady-state walking steps. The gain-limited closed-loop torque bandwidths of the Alpha device with 20 N-m and 50 N-m peak torques, were 21.1 Hz and 16.7 Hz, respectively. The phase-limited bandwidths for the Beta device, at a 30° phase margin, with 20 N-m and 50 N-m peak torques were 24.2 Hz and 17.7 Hz, respectively. Graph 760 of FIG. 7D shows a Bode plot depicting frequency response of the Beta system when mounted on a rigid test stand. Results from frequency response tests with the exoskeleton worn on a user's leg are superimposed in dotted lines to show differences in performance. Large differences between gain-limited and phase limited bandwidth may suggest that the system is less stable without the user. Similar bandwidth for both the 20 N-m and 50 N-m cases on the rigid test stand may indicate fewer nonlinearities in the system without the user. Graphs 770-795 of FIG. 7E shows results from power tests of the Alpha (770, 780, 790) and Beta (775, 785, 795) prototypes. The average peak power was measured to be 1068 W for the Alpha exoskeleton and 892 W for the Beta exoskeleton.

In walking trials with the Alpha device, the peak average measured torque was 80 N-m. The maximum observed torque was 119 N-m. The RMS error for the entire trial was 1.7±0.6 N-m, or 2.1% of peak torque, and the RMS error of the average stride was 0.2 N-m, or 0.3% of peak torque. For device Beta, the peak average measured torque was 87 N-m. The maximum observed torque was 121 N-m. The RMS error for the entire trial was 2.0±O.S N-m, or 2.4% of peak torque, and the RMS error of the average stride was 0.3 N-m, or 0.4% of peak torque.

Weighing less than 0.87 kg, both exoskeletons compare favorably to a tethered pneumatic device used for probing the biomechanics of locomotion and to an autonomous device for load carriage assistance. The Alpha and Beta devices demonstrated a six-fold increase in bandwidth over a pneumatically actuated device that recently reduced metabolic energy consumption below that of normal walking. Comparisons with other platforms are limited due to a lack of reported bandwidth values. In walking tests with users of varying shank lengths (0.42 m to 0.50 m), there are observed peak torques of 120 N-m, comparable to values from similar devices. These results demonstrate robust, accurate torque tracking and the ability to transfer large, dynamic loads comfortably to a variety of users.

Three-point contact with the user's leg implemented in both exoskeletons provided comfortable interfacing. Attachment point locations minimized the magnitude of forces applied to the body, while compliance in selected directions reduced interference with natural motions. Although differences in design led to more rigid struts in the Beta exoskeleton, compliance in the shoe and heel string was sufficient to enable comfortable walking.

While leaf springs are theoretically much lighter than coil springs for a given stiffness, increased size and additional hardware for improved robustness can limit mass savings. The Alpha lever arm assembly, including the two leaf springs, aluminum cross-bar, and connective hardware, was 19% lighter than the coil spring and titanium assembly of the Beta design. The Beta exoskeleton was designed for larger loads than the Alpha design. The Beta exoskeleton originally used a fiberglass leaf spring, which made the assembly 0.040 kg lighter and lengthened the ankle lever arm, thereby reducing torques at the motor. The coil spring that replaced the leaf spring, though heavier, increased robustness and made interchanging springs of different stiffness values easier.

Oscillations were present in the Bode plot phase diagram for the Alpha device at lower frequencies. These may be the result of un-modeled dynamics, particularly those of the tether and the human. Inspection of the time series torque trajectory showed ripples at lower frequencies that may have been caused by changes on the human side of the system or oscillations in the Bowden cable transmission. Bandwidth tests could be improved by including more data in the lower frequency range. This could be achieved by commanding an exponential, rather than linear, chirp in desired torque for a longer duration.

Optimizing Spring Stiffness:

A theoretical analysis was conducted based on the analytic expressions of the testbed system dynamics, desired torque, and torque controller and made hypotheses about the optimum of passive stiffness of series elastic actuators in lower-limb ankle exoskeletons and the interactions between optimal gains, desired stiffness and passive stiffness.

To further ease the theoretical analysis for the prediction of passive stiffness optimum in series elastic actuators, the system models the assisted walking with the ankle exoskeleton as an oscillator. Oscillators are efficient modeling tools in biological and physical sciences due to their capability to synchronize with other oscillators or with external driving signals. Multiple efforts have been made towards improving the synchronization capabilities of nonlinear oscillators by adapting their frequencies. The concept has been introduced and employed in locomotion to either improve the identification of central pattern generator parameters, to better estimate state measurements, or to help with controller design by exploiting the cyclic behavior of walking. Therefore, various states of walking are modeled as synchronized oscillations. This method disburdens the analysis from dealing with complicated human-robot interactive dynamics, focus on the resulting states like ankle kinematic profile and required motor position profile that are close to be periodical, and significantly simplified the analysis. However, neglecting of step-to-step variations in practical cases does cause potential deviation of results from theoretical models.

With proportional control and damping injection used for torque tracking:

$$\begin{aligned}\dot{\theta}_{p,des} &= -K_p e_\tau - K_d\dot{\theta}_p \\ &= -K_p[K_t(\theta_p R - \theta_e) + K_{des}(\theta_e - \theta_0)] - K_d\dot{\theta}_p\end{aligned} \quad (5.9)$$

Due to the employment of a high-speed real-time controller and a high-acceleration servo motor, desired motor velocity is enforced rapidly, based on which the simplification of immediate motor velocity enforcement is made, i.e.:

$$\dot{\theta}_p = \dot{\theta}_{p,des}. \quad (5.10)$$

Combining Eq. (5.10) with a linear approximation of desired torque curves, including those expressed by Equations (5.7) and (5.8), in the form of $$\tau_{des} = -K_{des}(\theta e - \theta_0), \quad (5.11)$$

there is:

$$(1+K_d)\dot{\theta}_p = -K_p[K_t(\theta_p R - \theta_e) + K_{des}(\theta_e - \theta_0)], \quad (5.12)$$

in which $\theta_0$ is maximum joint position for the device to exert torque on the human ankle, i.e., the intersection of torque-angle relationship with the angle axis. Modeling exoskeleton-assisted walking after stabilization as an oscillation process made of N sinusoidal waves of the same frequency F, there is a profile of the ankle angle in the form of:

$$\theta_e = C + \sum_{n=1}^{N} d_n \cdot \exp(j2\pi Ft + \beta_n), \quad (5.13)$$

where c is a constant denoting the offset of the profile on torque axis, $d_n$ and $\beta_n$ are the magnitude and phase shift of the $n_{th}$ sinusoidal wave, and t represents the time elapsed within one stride since heel strike. The corresponding stabilized motor position should also oscillate with the same frequency. A stabilized motor position by equal number of sinusoidal waves with the same phase shifts in the form of:

$$\theta_p = e + \sum_{n=1}^{N} f_n \cdot \exp(j2\pi Ft + \beta_n), \quad (5.14)$$

in which e is a constant and $f_n$ is a complex number. Substituting Eq. (5.13) and (5.14) into Eq. (5.12), there is Eq. (5.15):

$$\begin{aligned}&[(1+K_d)j2\pi F + K_pK_tR]\sum_{n=1}^{N} f_n \cdot \exp(j2\pi Ft + \beta_n) = -K_pK_t\mathrm{Re} - \\ &K_p(K_{des} - K_t)c + K_pK_{des}\theta_0 - K_p(K_{des} - K_t)\sum_{n=1}^{N} d_n \cdot \exp(j2\pi Ft + \beta_n)\end{aligned} \quad (5.15)$$

Equating the coefficients of the various sinusoidal waves and the offset, there is: and $$f_n = \frac{-K_p(K_{des} - K_t)}{(1+K_d)j2\pi F + K_pK_tR} d_n \text{ and} \quad (5.16)$$

$$e = -\frac{K_{des} - K_t}{K_tR}c + \frac{K_{des}}{K_tR}\theta_0. \quad (5.17)$$

Motor position profile in Eq. (5.14) can thus be expressed in terms of the ankle position profile and the controller as:

$$\begin{aligned}\theta_p = &-\frac{K_{des} - K_t}{K_tR}c + \frac{K_{des}}{K_tR}\theta_0 + \\ &\frac{-K_p(K_{des} - K_t)}{(1+K_d)j2\pi F + K_pK_tR}\sum_{n=1}^{N} d_n \cdot \exp(j2\pi Ft + \beta_n).\end{aligned} \quad (5.18)$$

Combining the oscillator assumption with Eq. (5.12), there is the expression of the torque error as:

$$\begin{aligned}e_\tau &= \tau - \tau_{des} \\ &= K_t(\theta_p R - \theta_e) + K_{des}(\theta_e - \theta_0) \\ &= K_tR\theta_p + (K_{des} - K_t)\theta_e - K_{des}\theta_0 \\ &= (K_{des} - K_t)\frac{(1+K_d)j2\pi F}{(1+K_d)j2\pi F + K_pK_tR}\sum_{n=1}^{N} d_n \cdot \exp(j2\pi Ft + \beta_n).\end{aligned} \quad (5.19)$$

It is clear that without considering the control gains, asserting that $$K_{des} - K_t = 0$$

will minimize torque tracking error. Therefore, the following hypothesis is made: Hypothesis 1. In lower-limb exoskeletons, the optimal passive stiffness of the series elastic actuator for torque tracking is:

$$K_{t,opt} = K_{des} \quad (5.20)$$

Relationship Between Torque Tracking Performance and the Difference of Desired and Passive Stiffness Another factor that limits torque tracking performance is the inability of the proportional gain to increase indefinitely. Reformatting Eq. (5.19), there is:

$$e_\tau = \frac{j2\pi F}{\frac{K_p}{1+K_d}K_tR + j2\pi F}(K_{des} - K_t)\sum_{n=1}^{N} d_n \cdot \exp(j2\pi Ft + \beta_n). \tag{5.21}$$

It is clear that when the passive stiffness is fixed but does not match the desired one, i.e.

$$K_t - K_{des} \neq 0$$

with the same step frequency F and angle profile $$\sum_{n=1}^{N} d_n \cdot \exp(j2\pi Ft + \beta_n).$$

torque tracking error $e_T$ is inversely proportional to $$\frac{K_p}{1+K_d}.$$

Meanwhile, combining the controller in Eq. (5.9) and the assumption of perfect motor velocity tracking in Eq. (5.10), there is:

$$\dot{\theta}_p = -\frac{K_p}{1+K_d}e_\tau \tag{5.22}$$

Differentiating the expression of applied torque in Eq. (5.3), there is:

$$\dot{\tau} = K_t(\dot{\theta}_p R - \dot{\theta}_e) \tag{5.23}$$

Therefore, the Time Derivative of Torque Error is:

$$\begin{aligned} \dot{e}_\tau &= \dot{\tau} - \dot{\tau}_{des} \\ &= K_t(\dot{\theta}_p R - \dot{\theta}_e) + K_{des}\dot{\theta}_e \\ &= -K_t R\frac{K_p}{1+K_d}e_\tau - K_t\dot{\theta}_e + K_{des}\dot{\theta}_e \end{aligned} \tag{5.24}$$

which is a first order dynamics created by feedback control with an effective proportional gain of:

$$\frac{K_t \cdot R \cdot K_p}{1+K_d}$$

and a time constant of:

$$\varsigma = \frac{1+K_d}{K_t \cdot R \cdot K_p}$$

However, this dynamic does not exist independently but interacts with the human body in parallel. Therefore, in practical cases, oscillations increase when effective proportional gain increases, which impairs torque tracking performances eventually and causes discomfort or injury to the human body. Motor speed limit was never hit. Thus there is a fixed torque tracking bandwidth limit that is dependent on the combined interactive dynamics of motor, motor drive, transmission and human body. This bandwidth limit results in a fixed maximum commanded change rate of torque error, $e_{T,max}$, which corresponding to the best tracking performance regardless of the passive stiffness of the system.

Therefore:

Conjecture 1. Assisted human walking with a lower-limb exoskeleton experiences a fixed maximum commanded tracking rate of torque error, $\dot{e}_{T,max}$, which limits the tracking performance of the system.

In practical cases, Eq. (5.24) can be further simplified. First, to realize real-time torque tracking, the motor velocity should be a lot faster than device joint velocity, i.e., $\dot{\theta}_p >> \dot{\theta}_e$. $\dot{\theta}_p >> \dot{\theta}_e$, which combines with the fact that R=2.5 results in the following fact about Eq. (5.23):

$$\tau \approx K_t R \dot{\theta}_p. \tag{5.25}$$

Successful torque tracking also means a fast changing rate of actual torque compared to the desired torque, $\tau >> \tau_{des}$, $\dot{\tau} >> \dot{\tau}_{des}$, which leads to the results of dominance of applied torque changing rate in torque error changing rate, i.e., $$\dot{e}_\tau \approx \dot{\tau} \tag{5.26}$$

Therefore, Eq. (5.24) can be estimated as:

$$\dot{e}_\tau \approx -K_t R\frac{K_p}{1+K_d}e_\tau \tag{5.27}$$

This is equivalent to say that A in Eq. (5.30) is small and neglectable and $$\frac{K_p}{1+K_d}$$

and Kt are inversely proportional to each other. The application of Conjecture 1 in this case results in a fixed time constant $$\frac{1+K_d}{K_t R K_p}$$

at optimal control conditions. Together with the assumption of a rather constant step frequency F and a constant angle profile $$\sum_{n=1}^{N} d_n \cdot \exp(j2\pi Ft + \beta_n),$$

torque error as expressed by Eq. (5.21) is proportional to the difference between passive and desired stiffness values, i.e., $$e_{\tau,opt} \propto K_{des} - K_t,$$

which then leads to the hypothesis below.

Hypothesis 2. The root-mean-squared torque tracking errors under optimal feedback control conditions are proportional to the absolute difference between the desired and passive stiffness values, i.e., $$\|e_{\tau,opt,RMS}\| \propto \|K_{des} - K_t\|. \tag{5.28}$$

Interactions Between Optimal Control Gains and Passive Stiffness

Dynamics in Eq. (5.24) directly leads to a relationship between Kp and Kt:

$$K_p = \frac{(K_{des}\dot{\theta}_e - \dot{e}_T)(1+K_d)R^{-1}e_T^{-1}}{K_t} - \dot{\theta}_e(1+K_d)R^{-1}e_T^{-1}, \tag{5.29}$$

which can be simplified under the same desired torque-angle relationship, i.e., $K_{des}$. A root-mean-squared tracking error of <8% the peak desired torque is shown under proportional control and damping injection, which is expected to be improvable with better control parameters and different curve types. This suggests that under optimal torque tracking conditions, the actual applied torque profiles with the same $K_{des}$, are expected to be fairly constant regardless of the value of passive stiffness Kt. Meanwhile, although the exact exoskeleton-human interactive dynamics is difficult to identify, the relationship between applies torque and resulting human ankle kinematics to obeys of Newton's law. Therefore, a fairly constant torque profile from the exoskeleton, when applied to the same subject under the same walking speed and step frequencies with low variance, should produce rather constant human and device joint kinematics, θe and θ'e. Therefore, the extreme device joint velocity that would produce the highest torque error rate with fixed control gains and push the controlled system to its bandwidth limit, $\theta_{e,ext}$, does not vary significantly across different passive stiffness conditions. Similar assumptions can be made about the extreme torque error $e_{T,ext}$. On the other hand, gain of the less dominant damping injection control part, $K_d$, have been observed to be upper-bounded by the appearance of motor juddering at $K_{d,max}$=0.6 for various stiffness combinations. The approximated invariance of $\theta_{e,ext}$ and $K_{d,max}$, combined with a fixed $e_{T,max}$ as assumed by Conjecture 1, lead to the following hypothesis. Hypothesis 3. With the same desired torque-angle curve, thus the same $K_{des}$, the optimal proportional gain $K_{p,opt}$ is related to the passive stiffness $K_t$ by:

$$K_{p,opt} = \frac{\sigma}{K_t} + \lambda, \tag{5.30}$$

in which σ is dependent on the desired stiffness $K_{des}$ and can be expressed as:

$$\sigma = (K_{des}\dot{\theta}_{e,ext} - \dot{e}_{\tau,max})(1+K_{d,max})R^{-1}e_{\tau,ext}^{-1} \tag{5.31}$$

and the constant λ is:

$$\lambda = -\dot{\theta}_{e,ext}(1+K_{d,max})R^{-1}e_{\tau,ext}^{-1} \tag{5.32}$$

To ease later presentation, the value a is labeled here as $K_p$-$K_t$ coefficient hereinafter. On the other hand, to realize torque tracking, proportional control is always dominant over damping injection. Therefore, Eq. (5.22) can be simplified as:

$$\dot{\theta}_{p,des} \approx K_p e_\tau \tag{5.33}$$

and accordingly, Eq. (5.27) becomes:

$$\dot{e}_\tau \approx -K_t R K_p e_\tau \tag{5.34}$$

which suggests that Hypothesis 3 can be simplified with an approximated inverse proportional relationship between the optimal $K_p$ and $K_t$. Therefore, the following corollary can be made. Corollary 1. For a fixed desired torque-angle relationship, i.e., $K_{des}$, when the passive stiffness of the series elastic actuator of the device is changed from $K_{t,old}$ to $K_{t,new}$, an estimate of the new optimal proportional control, $K_{p,new}$, can be achieved by:

$$K_{p,new} \approx \frac{K_{p,old}\cdot K_{t,old}}{K_{t,new}}, \tag{5.35}$$

in which $K_{p,old}$ is the optimal proportional control gain at $K_{t,old}$. Although multiple approximations have been made in the derivation of this corollary, which causes inaccuracies in this estimation, it can be used to set a starting point of proportional control gain tuning when system passive stiffness is changed with only the knowledge of the old and new passive stiffness values. Relationship Between $K_p$-$K_t$ Coefficient and Desired Stiffness Furthermore, combining Eq. (5.24), (5.30) and (5.32) at optimal control conditions, there is:

$$\begin{aligned} \dot{e}_{\tau,max} &= -\sigma R(1+K_{d,max})^{-1}e_\tau + K_{des}\dot{\theta}_e \\ &= -\sigma R(1+K_{d,max})^{-1}[\tau + K_{des}(\theta_e - \theta_0)] + K_{des}\dot{\theta}_e \end{aligned} \tag{5.36}$$

which means:

$$\sigma = \frac{(1+K_{d,max})K_{des}\dot{\theta}_e - \dot{e}_{\tau,max}}{R[K_{des}(\theta_{e,ext} - \theta_0) + \tau]} \tag{5.37}$$

With relatively invariant extreme ankle velocity values, $\theta_{e,ext(t)}$, and torque error values $e_{T,max}$, across different desired stiffness, at a time of similar measured torque T, the following hypothesis can then be drawn.

Hypothesis 4. The $K_d$-$K_t$ coefficient in Eq. (5.30) is related to the desired quasi-stiffness $K_{des}$ by:

$$\sigma = \frac{\varsigma\cdot K_{des} + \delta}{K_{des} + \xi}, \tag{5.38}$$

in which ζ, δ, and ξ are constant parameters, and $$\delta = \frac{(1+K_{d,max})}{R(\theta_{e,max} - \theta_0)}\dot{e}_{\tau,max}, \tag{5.39}$$

is linearly related to the hypothesized maximum commanded torque change rate $e_{T,max}$.

Figure 8:
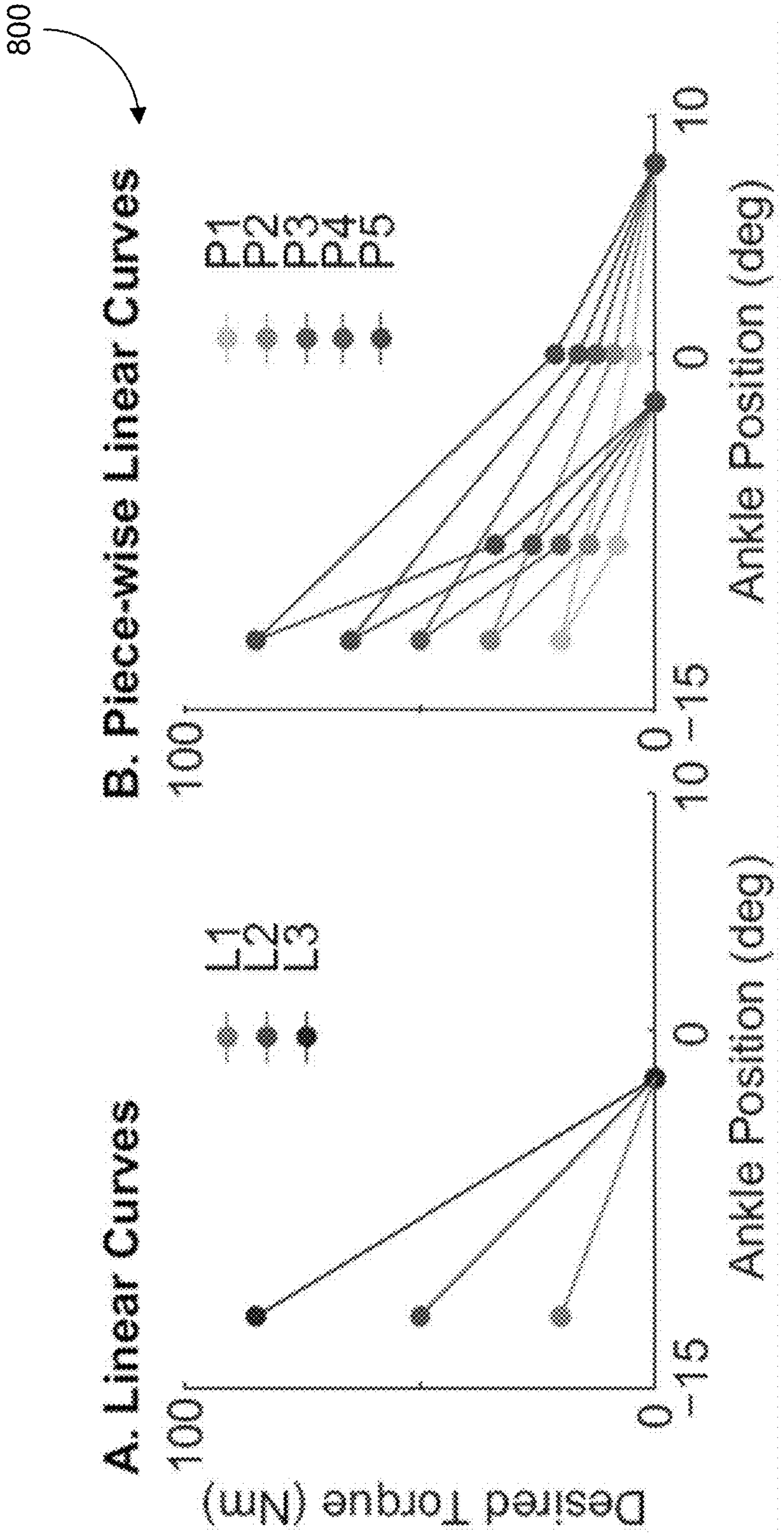
FIGS. 8-14 show graphs of spring stiffness optimization data.

To model the hypotheses, eight desired quasi-stiffnesses, i.e., torque versus ankle angle relationship, were implemented, including three linear and five piece-wise linear curves. A unit linear curve (S=1 in Eq. 5.7) was defined by parameter values in Table 5.1. The three linear curves, L1, L2 and L3, were achieved by scaling the unit curve on the desired torque axis with factors of 0.4, 1 and 1.7 respectively. On the other hand, a unit piece-wise linear curve (S=1 in Eq. 5.8) was defined by the parameter values listed in Table 5.2. Five piece-wise linear curves, P1, P2, P3, P4 and P5, were then achieved by scaling the unit curve with factors 0.4, 0.7, 1, 1.3 and 1.7. The resulting desired torque versus ankle angle curves are shown in graph 800 of FIG. 8.

TABLE 5.1

| Linear unit curve parameter values | | | |
|---|---|---|---|
| Param | Value | Param | Value |
| $[\theta_{0,1}\tau_{0,1}]$ | [−2, 0] | $K_{des,0}$ | 5 |

TABLE 5.2

| Piece-wise linear unit curve parameter values | | | |
|---|---|---|---|
| Param | Value | Param | Value |
| $[\theta_{0,p}\tau_{0,p}]$ | [−2, 0] | $[\theta_{1,p}, \tau_{1,p}]$ | [−8, 20] |
| $[\theta_{0,p}, \tau_{2,p}]$ | [−12, 50] | $[\theta_{3,p}, \tau_{3,p}]$ | [0, 12.5] |
| $[\theta_{4,p}, \tau_{4,p}]$ | [8, 0] | | |

Calculation of desired quasi-stiffness values are different for linear and piece-wise cases. For linear curves, the values of L1, L2 and L3 can be easily evaluated as 2, 5, and 8.5 Nm/deg respectively. This set spans a range of 6.5 Nm/deg with a maximum that is 4.25 times the minimum. For the case of piece-wise linear curves, the desired stiffness values of each of the four phases was used, and different phases were modeled separately. The desired quasi-stiffness values in this case ranges from 0.625 to 12.75 Nm/deg.

Figure 9:
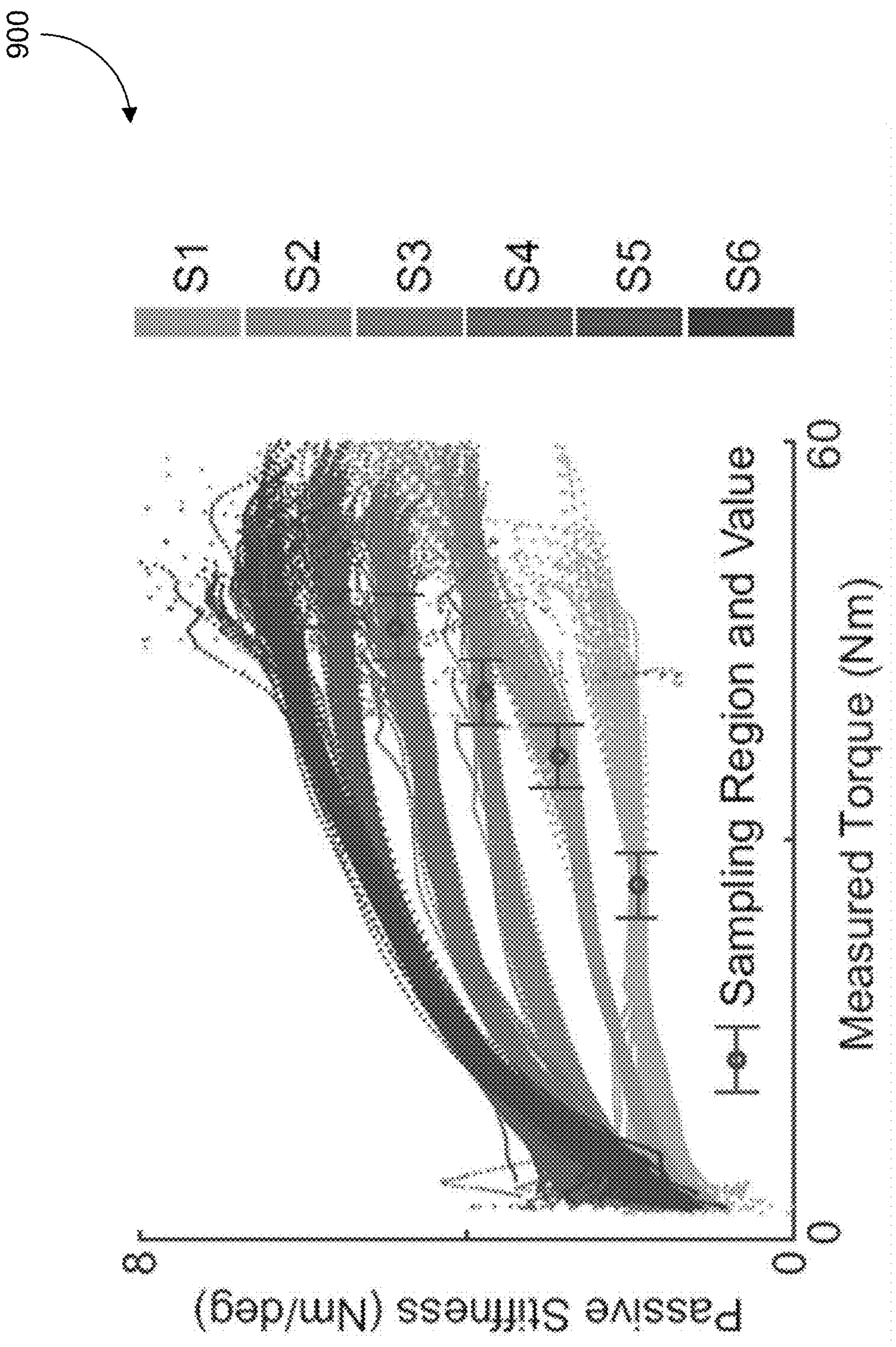

For each of the desired stiffness profile defined by a torque-angle relationship, six passive series stiffness values of the transmission system were realized by changing the series spring of the ankle exoskeleton (FIG. 5.1.A). Five of them were achieved by attaching different compression springs (Diamond Wire Spring, Glenshaw, Pa.) at the end of the series elastic actuators. One was realized by getting rid of the spring in the structure, in which case the system passive stiffness is solely determined by the stiffness of the synthetic rope in Bowden cable. The list of springs used and their corresponding properties are available in Table 5.3.

torque values. FIG. 9 presents such plots 900 of passive walking sessions for different spring configurations, one session for each configuration. Median of the instantaneous passive stiffness values within the stabilized region was defined as the stabilized passive stiffness value of the session. For any spring configuration, its stabilized region is defined as a 5.65 Nm torque range, within which the change of trend for the instantaneous passive stiffness averaged over all sessions is minimum.

The difference between the desired and passive stiffnesses is an important index since Hypotheses 1 and 2 state that the optimal passive stiffness for torque tracking equals the desired quasi-stiffness and torque errors are closely related to the difference between the two. In analyzing the results, this value is defined as the algebraic difference between the desired and passive values, i.e., $K_t$-$K_{des}$.

The key to be able to compare the influence of passive stiffness on torque tracking performance under a fixed desired quasi-stiffness is to evaluate the 'best' tracking performance under each passive stiffness configuration. This was done by evaluating the tracking errors of multiple tests, each with different feedback control gains. The lowest error across these trials was then assigned as the estimate of the actual optimal performance with this passive stiffness.

For each combination of desired and passive stiffnesses, the initial session had fairly low proportional and damping gains. The gains were gradually increased across trials until perceptible oscillations were detected with maximum damping gain. Depending on the initial gains and step sizes of gain tuning, number of trials varies for each stiffness combination. Sometimes, the gains are lowered in the final sessions to achieve better gain tuning resolution. On average, around ten trials were conducted for each stiffness combination.

Identification of the best torque tracking performance for a specific desired and passive stiffness combination is crucial. The step-wise root-mean-squared (RMS) torque tracking errors averaged over the one hundred steady steps was calculated as its performance indicator. For each combination of desired and passive stiffnesses, the RMS error values of all trials with different gains were compared. The lowest of them was recorded as the estimate of optimal torque error for the corresponding stiffness combination. The control

TABLE 5.3

| List of springs used in experiments with assigned ID | | | | | | |
|---|---|---|---|---|---|---|
| Passive Stiffness ID | S1 | S2 | S3 | S4 | S6 | S6 |
| Spring Part No. | DWC-148M-13 | DWC-162M-12 | DWC-187M-12 | DWC-225M-13 | DWC-250M-12 | No Spring |
| Length (m) | 0.0635 | 0.0508 | 0.0508 | 0.0635 | 0.0508 | — |
| Spring Rate (N/m × $10^3$) | 15.1 | 27.5 | 50.1 | 103.1 | 235.7 | — |
| Max Load (N) | 413.7 | 578.3 | 778.4 | 1641.4 | 2246.4 | — |

The effective passive stiffness values of various spring configurations, $K_t$, are evaluated based on passive walking data. For each of six passive stiffness configurations, the human subject walks on the treadmill for at least one hundred steady steps wearing the exoskeleton with the motor position fixed at the position where force starts to be generated with the subject standing in neutral position. Such walking sessions were repeated multiple times for the same passive stiffness. For each session of one hundred steps, the instantaneous value of passive stiffness at each time stamp was calculated and presented in relation to the measured gains of the corresponding data set were recorded as the estimates of optimal control gains.

Then, the lowest torque tracking errors and the control gains for all stiffness combinations were investigated against the difference between desired and passive stiffness values to test the hypotheses. This process is demonstrated in graph 1000 of FIG. 10, which presents the control gains, sequence, resulting RMS torque errors and the corresponding oscillation levels of measured torques for each data set with one combination of desired and passive stiffness.

Figure 10:
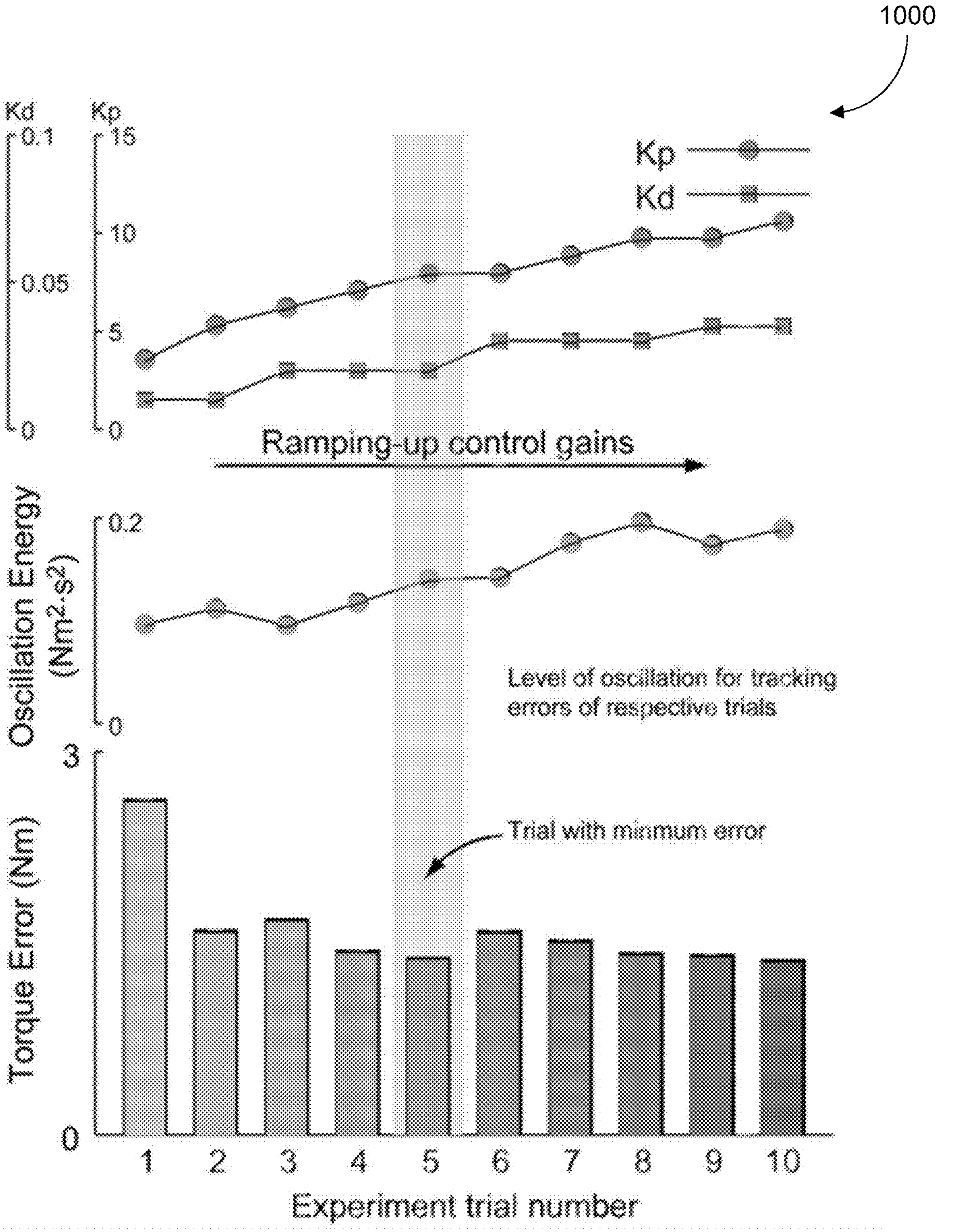
Figure 11:
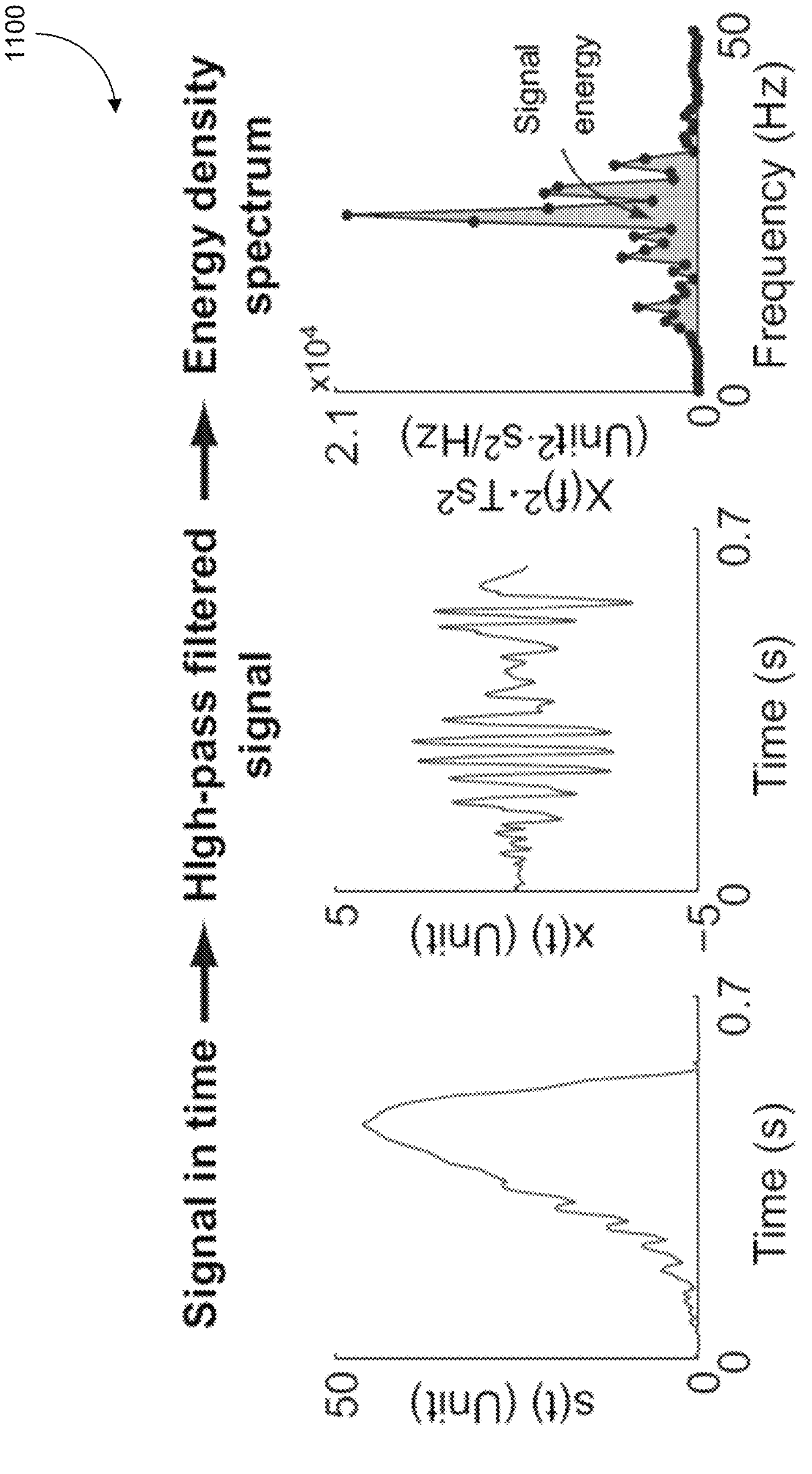

The level of oscillation included in FIG. 10 is an indicator defined to show the amount of oscillations in the control results of each test. As exemplified in graph 1100 of FIG. 11, oscillation level is defined as the mean stride-wise oscillation energy of the torque tracking error signal above 10 Hz. The total oscillation energy of a signal s(t) within one stance period is achieved by firstly high-pass filtering it at 10 Hz. The filtered signal, x(t), is converted to frequency domain using Fast Fourier Transform. The resulting signal in frequency domain, X(f), is used to construct the energy spectral density as $X(f)^2 \cdot Ts^2$. The total energy of oscillation of signal s(t) is then calculated as the integral of the energy spectral density. The level of oscillation of a signal is then achieved by averaging the stride-wise torque error oscillation energy.

The resulting stabilized passive stiffness values are listed in Table 5.4. Although the reported spring stiffness values span a huge range (Table 5.3), the actual maximum value is only around three times the minimum due to the existence of the Bowden cable synthetic rope in series with the spring, which exhibits the property of a nonlinear spring.

Over five hundred successful tests, each identified by a unique combination of control gains, desired curve and passive stiffness, were conducted with different linear and piece-wise linear curves and used for data analysis.

TABLE 5.4

List of measured stabilized passive stiffness values

| Passive Stiffness ID | S1 | S2 | S3 | S4 | S5 | S6 |
|---|---|---|---|---|---|---|
| $K_t$ (Nm/deg) | 1.9 | 2.8 | 3.7 | 4.7 | 5.6 | 5.9 |

Over five hundred successful tests, each identified by a unique combination of control gains, desired curve and passive stiffness, were conducted with different linear and piece-wise linear curves and used for data analysis.

Figure 12:
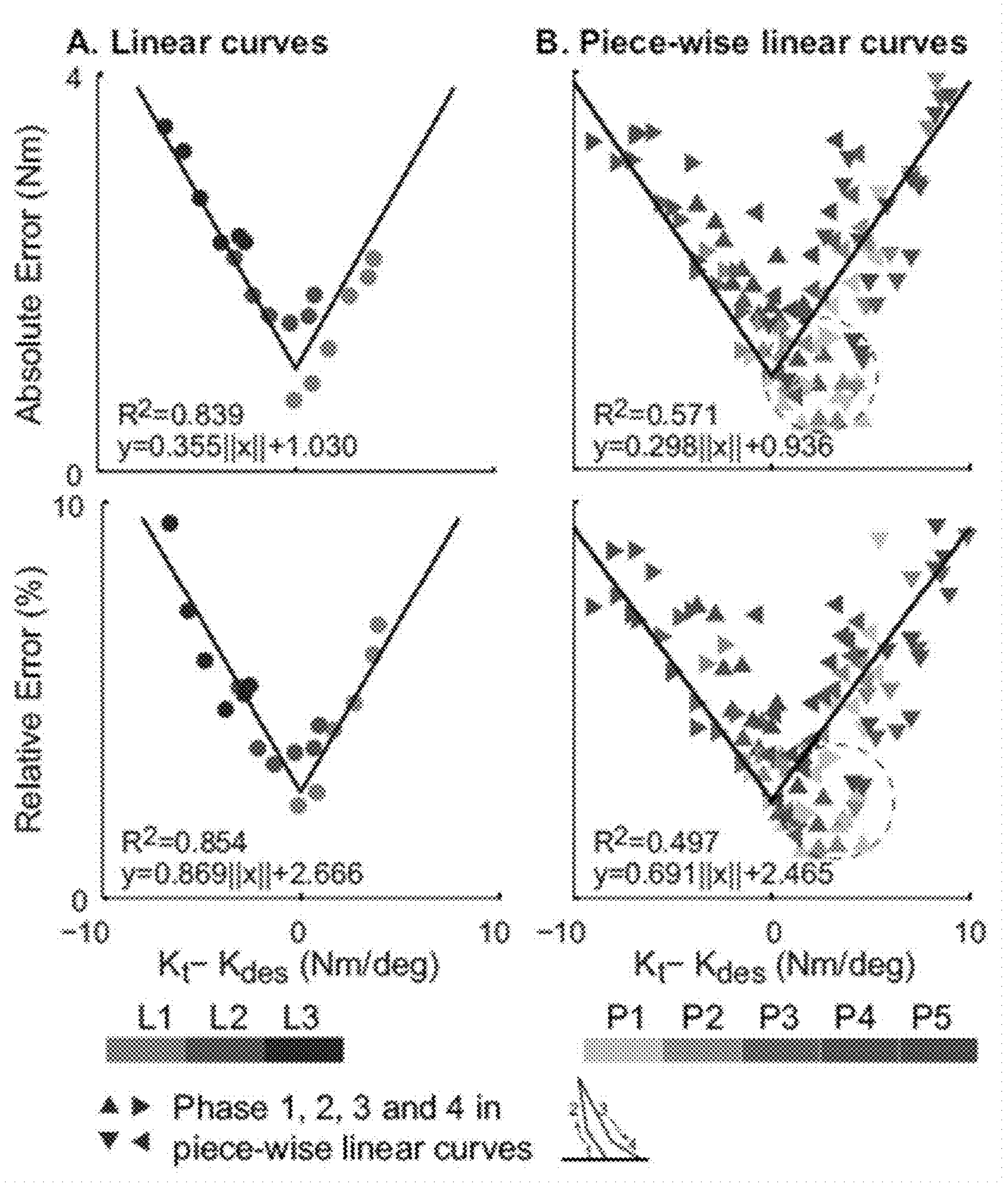

Estimated optimal tracking errors, i.e., the RMS torque errors of the data sets with minimum errors, for linear curves are approximately linearly related to the absolute difference between desired and passive stiffness values as hypothesized by Hypothesis 1 and 2 (graph 1200 of FIG. 12). It can be observed that torque errors show strong linear correlation with the absolute value of $K_t$-$K_{des}$ in cases of both individual desired curves and all curves combined. Minimum torque errors for all curves combined are linearly related to a translated absolute value of $K_t$-$K_{des}$, i.e.:

$$e_{T,opt,RMS}=a\cdot\|K_t-K_{des}\|+b \tag{5.40}$$

with a coefficient of determinant R2=0.839 at a slope of a=0.355 for the absolute ones and R2=0.854 at a=0.869 for the relative ones.

For piece-wise linear curves, the RMS torque errors of separate phases for data sets with minimum errors are also well correlated to their corresponding differences between the passive and desired stiffnesses (graph 1200 of FIG. 12). The absolute and relative errors for all phases and curves combined are fitted with the translated absolute value of $K_t$-$K_{des}$ with coefficients of determination R2=0.571 and R2=0.497 respectively. The slopes are a=0.298 and a=0.691. Note that for phases 1, 2 and 4, a fixed desired slopes exists in all steps of all data sets for the same desired curve. However, for phase 3, since the peak dorsiflexion angle is different for each step of each data set, the desired slope for a trial with minimum errors is defined as the phase 3 slope in its average stride.

For the cases of both curve types, results (FIG. 12) agree with Corollary 2, and thus both Hypothesis 1 and 2, which serve as bases for it.

Figure 13:
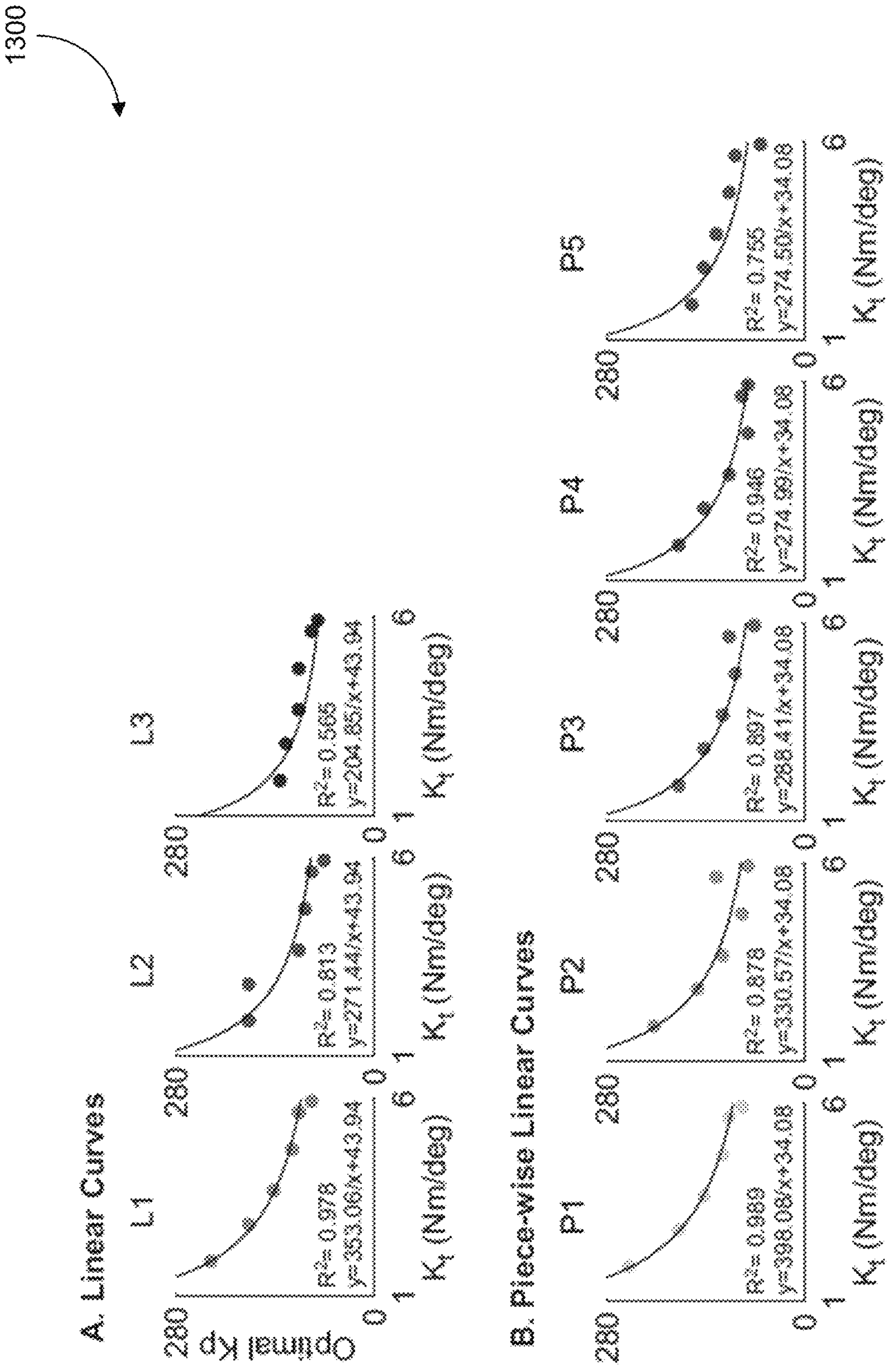

Control gains show interactions with desired and passive stiffnesses (graph 1300 of FIG. 13). The proportional gains of the trials with minimum errors for all desired curves, which are the estimates of optimal proportional gains, saw strong inversely proportional correlation with passive stiffness values (R2≥0.565). For each desired curve, data were fitted into a curve with the same format as Eq. (5.30), in which the same λ values were asserted for all curves of the same type, i.e., linear or piece-wise linear. This result agrees with Hypothesis 3, which is based on Conjecture 1.

The $K_p$-$K_t$ coefficient, σ, as identified in FIG. 13 was also seen to be inversely proportional to the desired stiffness (graph 1400 of FIG. 14), which agrees with Hypothesis 4 based on Conjecture 1. Note that for each piece-wise linear curve, its effective desired stiffness is defined the mean of phase-wise desired stiffness values averaged over all the six best-performed data sets, one for each spring configuration.

Although a simplified model of the transmission subsystem was considered, torque tracking results in FIG. 12 for linear curves highly agrees with Hypothesis 1 & 2. However, the phase-wise errors for piece-wise linear curves show slightly less agreement with the hypothesis. One reason is that the control gains were optimized based on full-step instead of phase-wise performance. According to the interactions between optimal proportional gains, desired stiffness and passive stiffness presented in FIG. 13, for the same passive stiffness configuration, a larger desired stiffness results in a smaller optimal proportional gain. However, the level of oscillations and step-wise root-mean-squared torque errors are collectively determined by tracking performance of all four phases. Therefore, the optimal proportional gain for a piece-wise linear curve is expected to be higher than the optimal gain for the phase with largest desired stiffness and lower than the one with smallest. This means that the phase-wise torque errors in piece-wise linear curves are noisier than those of linear curves. Another issue was that for some phases, for example phase 1 of P1, P2 and P3, the desired torques were very low. Since the Bowden cable rope was still slacking at the beginning of stance, the effective passive stiffness values were actually a lot smaller than the stabilized values used in data analysis. Therefore, many data points as circled in FIG. 12 should be shifted to the left, which will improve the fitting. The effective difference in desired and passive stiffness was evaluated, $K_t$-$K_{des}$, of piece-wise linear curves for full steps and present torque errors in a way similar to the linear curves in FIG. 12. The effective desired stiffness of piecewise linear curves was generated by linearly fitting the average stride and use it to then calculate $K_t$-$K_{des}$. Another method was to calculate the difference as the area between desired stiffness versus torque curve and passive stiffness versus torque curve. For both cases, the relationships between torque errors and effective stiffness differences showed significantly less agreement with Eq. (5.28) than FIG. 12. This suggests that when Hypothesis 1 and 2 are used in guidance to choose passive stiffness, the concerning desired stiffness value Kr should be the instantaneous values instead of a collective determined values.

Meanwhile, there are other factors that add noise and complexions to the data, which causes imperfection in curve fitting and non-zero torque errors at $K_t$=$K_{des}$ as shown in FIG. 12. The first factor is the method used. The optimal performance of each desired and passive stiffness combination were achieved by gradually increasing proportional and damping injection gains until perceptible oscillations happen with maximum damping gains. There are multiple noise sources cased by this test scheme. The most obvious one is the testing of discrete gain values, which results in the fact that the gain values of the best-performed test are mostly not the optimal gains but actually values close to them. Second, increase of control gains stop when the oscillations become noticeable for the subject, which makes the stopping criteria subjective. Although the same subject was use throughout all tests, adaptation and subject physical condition both affect the subject's judgment of when discomfort starts, which potentially leads to higher gains tested when the subject has higher tolerance. In some cases, increase of gains stop before the torque errors hit minimum due to inability of human to tolerate oscillations, which affects the estimation of minimum torque errors and optimal control gains. Besides subjectivity of testing, actual changes in system dynamics also causes noises in data. These changes include subject physical condition across tests, human body instant mechanical properties changes due to muscle tensioning, gait variations and movements in human-exoskeleton interface. Another reason that led to imperfection in the alignment between theory and results is the employment of a highly simplified system partial model. Due to the presence of nonlinear, uncertain, highly complex and changing dynamics, a lot of system features were not captured in the theoretical hypothesis. One complication that contributed was the nonlinear property of the system passive stiffness due to the slow stretching property of the Vectran cable as demonstrated by FIG. 9. Due to the unstructured changes of passive stiffness between different loads and trials, only one stabilized value was used for each passive stiffness configuration. Another feature that causes complication into system dynamics but was not accounted for in theoretical analysis was the highly nonlinear, complex and changing frictions in Bowden cable. Besides, the assumption was made of immediate perfect motor position tracking, which is not true in practical cases due to the limitation of motor velocity. This greatly contributed to the fact that when the passive stiffness matches desired stiffness, i.e., $K_t=K_{des}$, torque errors are above zero under optimal control conditions.

Figure 14:
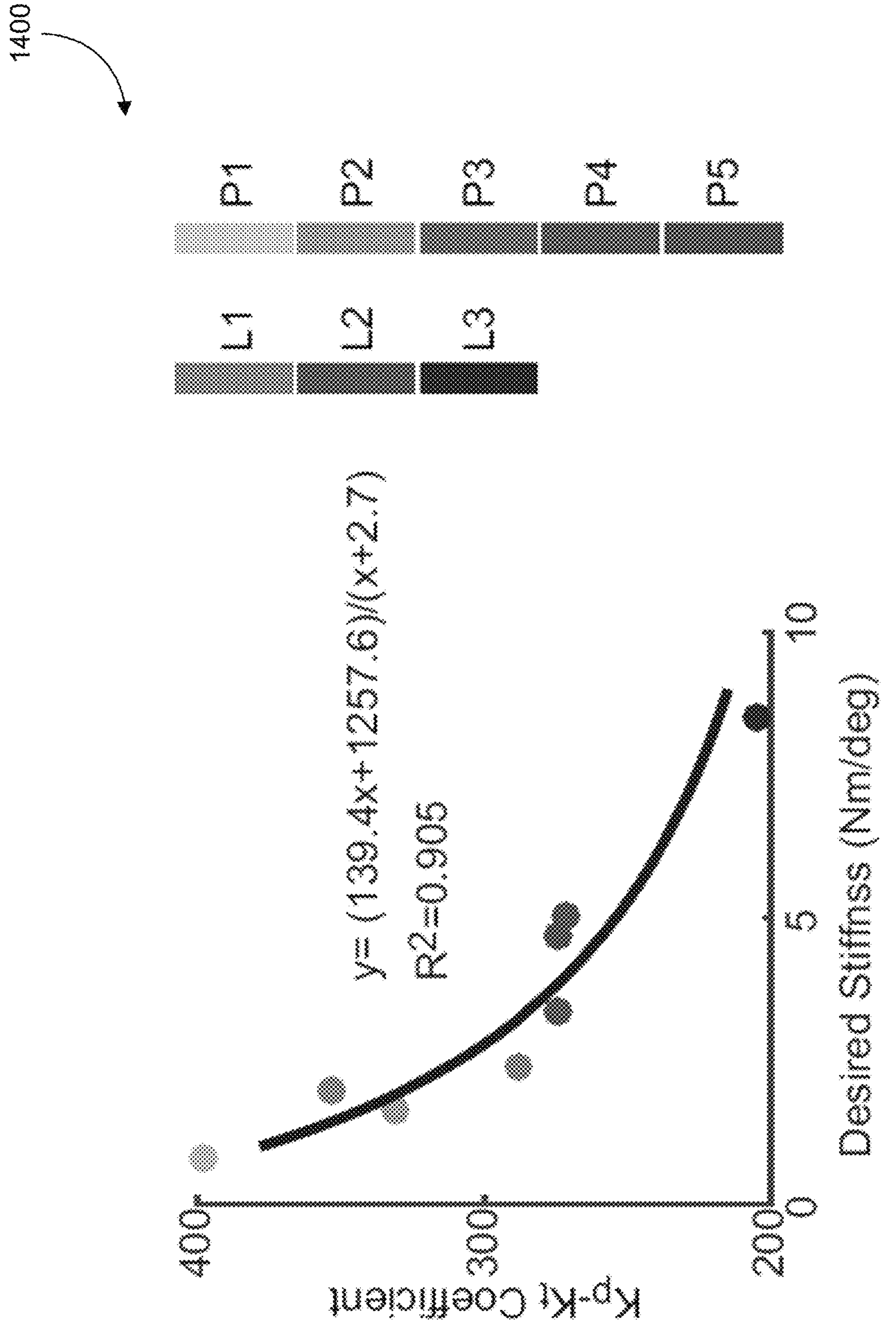

Regardless of the various approximations made in various hypotheses, the results presented FIGS. 12-14 support them with fairly strong correlations. The conjecture of a fixed bandwidth and thus a maximum torque error tracking rate, $e_{T,max}$, as a limit for proportional gain increase suggests a potential way of systematic gain tuning when desired or passive stiffness is changed for the same subject. Since the dependence of this maximum error changing rate on full system dynamics, it is expected it is subject-dependent for the same motor system.

Series elasticity plays a large role in torque tracking performance, but optimal spring stiffness may be a function of individual morphology, peak applied torques, and control strategies and might be difficult to predict. In pilot tests with the Beta device, very stiff or very compliant elastic elements worsened torque tracking errors. This was not the case for the prosthetic device, in which the Bowden cable itself provided sufficient series compliance. This may be because the prosthesis is in series with the limb, and therefore receives more predictable loading.

Figure 15:
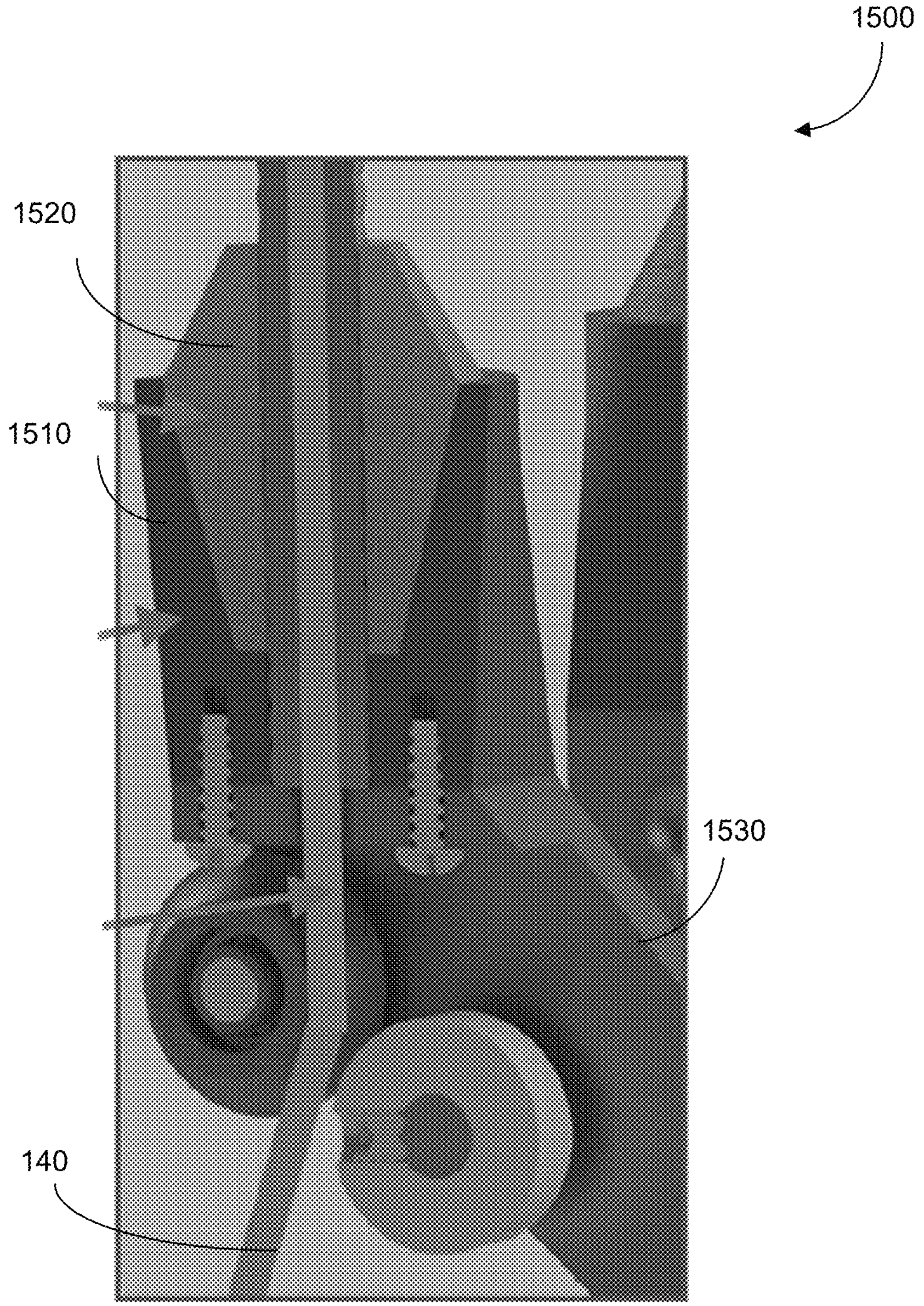
FIG. 15 shows a cable strain relief system.

FIG. 15 shows a cable strain relief system 1500. A cuff 1510 is disposed around the cable 140 where the cable is redirected by a frame 1530 of the exoskeleton device. The frame 1530 can be a portion of the shank component of the ankle exoskeleton devices described above. The frame 1520 can be a portion of the ankle lever. The cuff 1510 can be formed of a plastic material. In some implementations, the cuff 1510 includes a metal material, such as aluminum. The cuff 1510 provides a rigid support for an elastic element 1520. As the cable 140 (e.g., the Bowden cable) is pulled during use of the exoskeleton device, the cable exerts lateral forces on the cuff 1510 and elastic element 1520. The elastic element 1520 softens the force felt by a user of the exoskeleton device and reduces strain on the cable 140.

Figure 16:
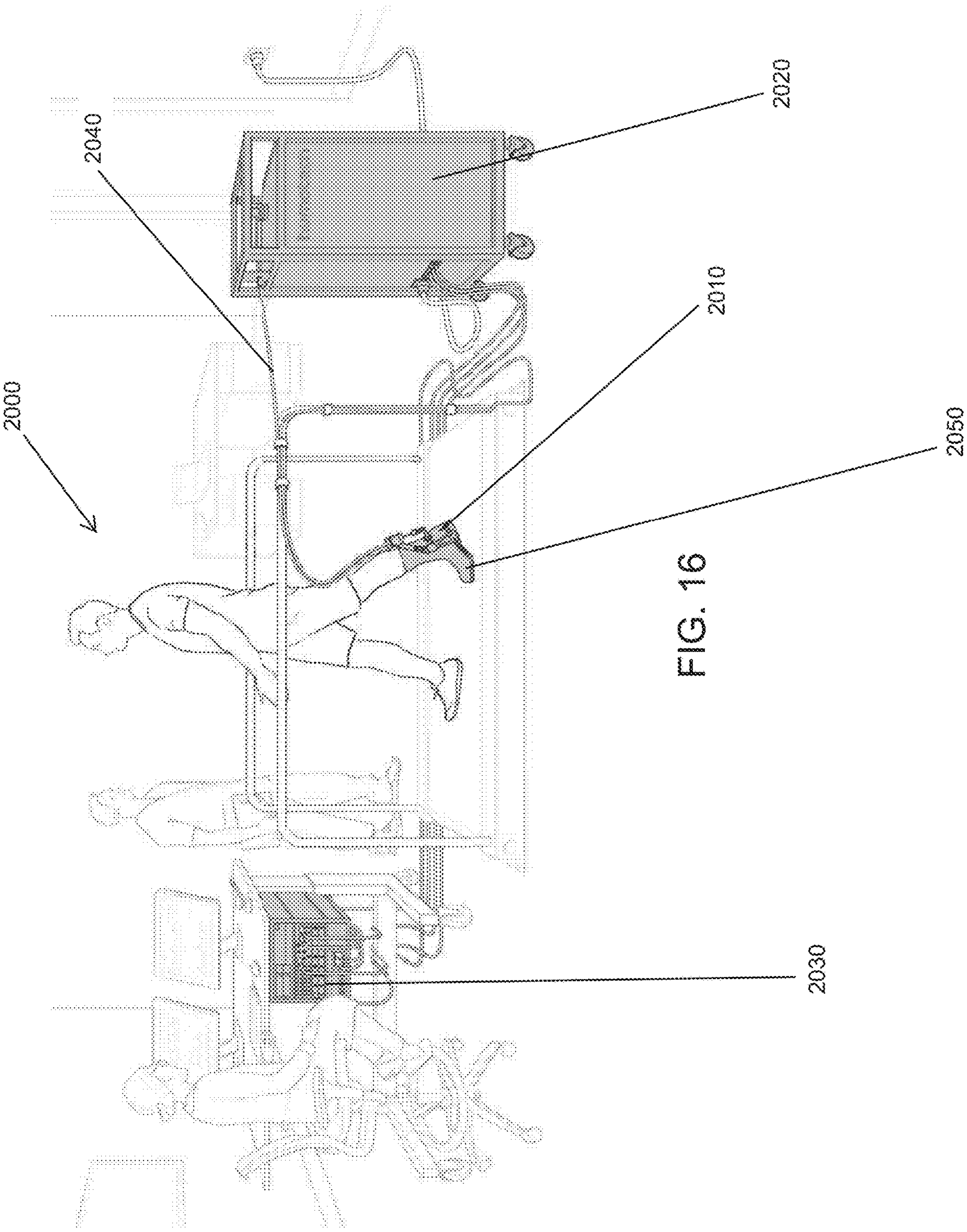
FIG. 16 is a schematic representation of an exoskeleton emulator system comprising an exoskeleton device according to at least one aspect of the disclosure.

FIG. 16 depicts an exoskeleton emulator system 2000 and an ankle exoskeleton end-effector 2010. A testbed includes an off-board motor 2020 and a motor controller 2030, a flexible transmission cable 2040, and the ankle exoskeleton end-effector 2010. The ankle exoskeleton end-effector 2010 is incorporated into and/or otherwise attached to a shoe 2050 worn by a user. The exoskeleton end-effector 2010 is shown and described in greater detail with respect to FIGS. 17-23. The motor 2020 is configured to provide a tension to the cable 2040 that attaches to the exoskeleton end-effector 2010. The tension applied to the cable 2040 applies torque to a joint of the exoskeleton end-effector 2010. The torque applied to the exoskeleton end-effector 2010 assists the motions of the user ankle as described herein. The motor 2020 is controlled by the motor controller 2030, which receives data from one or more sensors that are attached to the exoskeleton end-effector 2010. The one or more sensors can comprise a torque sensor, for example. The motor controller 2030 uses the data that is received to control the motor 2020 to apply tension to the cable 2040 at specific times and thus apply torque to the joint of the exoskeleton end-effector 2010 and assist the user.

As mentioned above, the exoskeleton emulator system 2000 comprises two off-board components. The two off-board components comprise the motor, or actuator unit, 2020 and the motor controller, or control system 2030. The actuator unit 2020 incorporates one or more industrial servomotors and drives into a compact, portable package for high-performance actuation of cable-actuated exoskeletons. In various instances, the actuator unit 2020 and control system 2030 are located in a backpack or other garment or accessory worn by the user, with the cable 2040 running from the backpack (or other garment or wearable accessory) to the exoskeleton end-effector 2010. In other embodiments, the actuator unit 2020 and control system 2030 can be located in any suitable location relative to the exoskeleton end-effector 2010, such as shown in FIG. 16. In various instances, the control system 2030 comprises a Windows Host PC, a real-time controller, and an I/O unit. The exoskeleton end-effector 2010 is actuated by the powerful off-board motor 2020 and the real-time controller 2030, with mechanical power transmitted through a flexible Bowden cable tether 2040.

The cable, or flexible tether, 2040 connects the actuator unit 2020 to the exoskeleton end-effector 2010 worn by the user. The flexible tether 2040 may comprise a Bowden cable for mechanical transmission of force and motion from the actuator unit 2020 to the exoskeleton end-effector 2010 and a standard electrical cable (e.g., DB15 electrical cable) for transmission of sensor and other electrical signals between the control system 2030 and the exoskeleton end-effector 2010.

Figure 17:
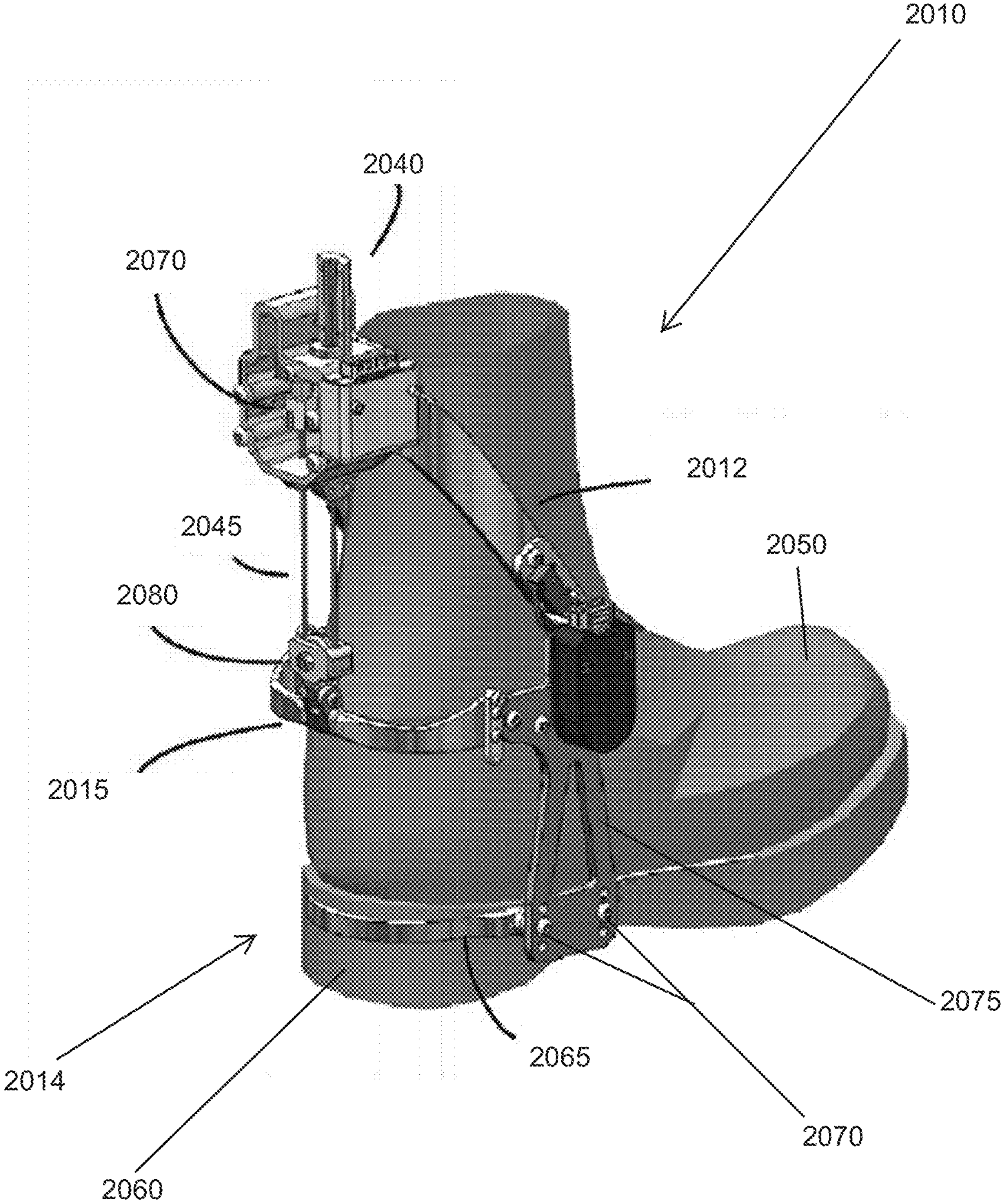
FIG. 17 is a perspective view of the exoskeleton device of FIG. 16 according to at least one aspect of the disclosure.

As shown in greater detail in FIG. 17, the exoskeleton end-effector 2010 interfaces with the shoe 2050 of the user. The ankle exoskeleton is easily integrated into the shoe 2050, allowing for the ankle exoskeleton to be easily put on and removed by the user. The ankle exoskeleton can be disassembled from the shoe without compromising the functionalities of the shoe. The ankle exoskeleton is suitable for a range of walking and running speeds limited by the user's biological ankle. The ankle exoskeleton 2010 applies ankle torque to the user through the shoe 2050. Although the depicted shoe 2050 is a boot, any suitable high-top, lack-up shoe and/or boot is preferable for use with the ankle exoskeleton. For example, the shoe 2050 can be a boot, a running shoe, dress shoes, sandals, and/or sneakers.

A rigid, preferably unhinged, insert 2065 is attached to and/or otherwise incorporated within the sole 2060 of the shoe 2050, preferably between an inner layer and an outer layer of the shoe's sole, to create an enforced midsole. The rigid insert 2065 is inserted into the sole 2060 of the shoe 2050 without damaging the functionality of the shoe 2050 itself. The rigid insert 2065 is comprised of any suitable material capable of providing a level of rigidity to the sole 2060 of the shoe 2050. In various instances, the rigid insert 2065 comprises metal, carbon fiber, aluminum, hard plastic, and/or any combination thereof. The rigid insert 2065 may extend the complete length of the sole 2060 or extend any suitable length along the sole 2060 that is less than the complete length of the sole. In various instances, the rigid insert 2065 comprises one or more dimensions that are greater than the sole 2060 of the shoe 2050. As shown in FIG. 17, the rigid insert 2065 comprises a variable thickness, wherein the thickness of the rigid insert 2065 decreases along a length of the rigid insert 2065 from heel to toe. For example, the rigid insert 2065 comprises a first thickness at a first position, wherein the first position is aligned underneath the heel of a user. The rigid insert 2065 comprises a second thickness at a second position, wherein the second position is aligned underneath the arch of the user's foot, and wherein the first thickness is greater than the second thickness. In other instances, the rigid insert 2065 comprises a uniform thickness.

Various combinations of insert 2065 geometries, dimensions, and/or materials are contemplated. For example, an insert 2065 extending along the majority of the sole 2060 comprised of a compliant material can provide sufficient reinforcement to the shoe 2050 for use with the disclosed exoskeleton. However, if the insert 2065 is too long and comprised of an excessively stiff material, the midsole of the shoe 2050 can become too rigid. Excessive rigidity can lead to discomfort for the user, for example. In another instance, if the insert 2065 is too short and/or comprised o a soft material, the insert 2065 may not be sufficiently reinforced. Insufficient reinforcement can lead to damage to the shoe 2050 and/or can limit the ability to transmit force and/or torque through the exoskeleton. In various instances, the optimal combination of insert geometries, dimensions, and/or composition is shoe, user, and/or task-dependent.

In various instances, an existing midsole of the shoe can be utilized for attachment to the external devices, such as the ankle exoskeleton 2010. Stated another way, embodiments are envisioned where reinforcement to an existing midsole is not needed. For example, in shoes such as work boots, for example, the existing midsole may be stiff enough to transmit the desired force and/or torque. In shoes such as running shoes and/or tennis shoes, reinforcement may be necessary in order to transmit the desired force and/or torque. In such instances, the midsole may be reinforced through incorporation of a rigid insert as described herein, for example.

The ankle exoskeleton 2010 depicted in FIGS. 16-23 is a lightweight, high-performance tethered ankle exoskeleton. The ankle exoskeleton 2010 accommodates greater peak velocity and range of motion than observed at the ankle during unaided fast walking. The ankle exoskeleton 2010 can withstand peak plantarflexion torque of 50 N-m, for example, with single-pulley load amplification as described below; however, peak torque can be adjusted through changing the number of pulleys present in the ankle exoskeleton 2010. Due at least in part to its lower torque output of approximately 50 N-m, the ankle exoskeleton is sleek and form-fitting, allowing for agile movement over uneven terrain. The exoskeleton frame includes rotational joints on either side of the ankle, with axes of rotation approximately collinear with that of the human joint. The ankle exoskeleton 2010 has a range of motion of 45 degrees plantarflexion to 43 degrees dorsiflexion, with 0 degrees corresponding to a natural standing. The range of motion of the ankle exoskeleton is adjustable.

In various instances, the ankle exoskeletons 200, 300, 2010 described herein comprise an adjustment lock to avoid hyperextending a user's joint(s). The adjustment lock can comprise a mechanical stop to limit the range of motion of the ankle exoskeleton. The mechanical stop prevents excessive joint movement and, thus, protects the user from getting injured by the exoskeleton, for example. The ankle exoskeletons 200, 300 use a contact-style mechanical stop, wherein two components are in contact when the exoskeletons 200, 300 are at the pre-defined maximum plantarflexion angle. The ankle exoskeleton 2100 comprises a mechanical stop mechanism, wherein the torque producing lever arm length drops to zero "0" at a predefined maximum plantarflexion angle, thereby ensuring the exoskeleton stops producing plantarflexion torque beyond the maximum plantarflexion angle. Such a mechanical stop mechanism is intrinsically safe as it does not rely on hard contact between two components. Reliance of hard contact between two components is more subject to failure.

As discussed above, the exoskeleton is easily assembled to and/or disassembled from the user's shoe. As shown in FIG. 17, the exoskeleton 2010 is releasably attached to the shoe 2050 with fasteners 2070. As described in greater detail with respect to FIGS. 24 and 25, the fasteners 2070 can be of any suitable type to secure the exoskeleton 2010 to the shoe 2050 until the user desires to decouple and/or disassemble the device. The exoskeleton 2010 can be separated into a foot section 2014 and a shank assembly 2012. The foot section 2014 comprises a lever arm 2015 posterior to the ankle that wraps around the heel. The form-fitting lever arm 2015 is attached to a heel portion of the midsole 2065 of the shoe 2050. The Bowden cable 2040 pulls up on the lever arm 2015 while the Bowden cable conduit 2040 presses down on the shank assembly 2012. The force is transmitted to the user's foot through enforced material inside the midsole 2065. The enforced midsole 2065 eliminates the need for the hinged plate 230, 330 of the Alpha and Beta exoskeletons, respectively. The elimination of the hinged plate 230, 330 significantly decreases the forefoot width. The ankle exoskeleton is further attached to the shoe at the top of the shoe. A form-fitting shank strut is attached to a top portion of the shoe. The shank strut applies force normal to the shank through the lacing system of the shoe. The shank strut bares reaction force caused by cable pulling. The shank assembly of the ankle exoskeleton is mostly located on the back of the user's leg, which allows for a larger inversion and/or eversion range of motion and a higher tolerance of the user's leg size as compared to the ankle exoskeletons 200,300.

The ankle exoskeleton 2010 further comprises a force sensing component. The force sensing component comprises a load cell and/or a strain gauge 2070. For example, the exoskeleton 2010 can sense ankle angle with optical encoders (e.g., E4P and E5, respectively, US Digital Corp., Vancouver, Wash., USA) and foot contact with switches (e.g., 7692K3, McMaster-Carr, Cleveland, Ohio, USA) in the heel of the shoe. In various instances, the exoskeleton 2010 uses a load cell 2070 (e.g., LC201, Omega Engineering Inc., Stamford, Conn., USA) to measure Bowden cable tension. In various instances, the exoskeleton 2010 uses strain gauges (e.g., MMF003129, Micro Measurements, Wendell, N.C., USA) in a Wheatstone bridge (or variant thereof) on the ankle lever to measure torque directly. The force sensing component is mounted to the shank assembly. Thus, the force sensing component is static relative to the shank strut. The force sensing component is positioned on an upper portion of the shoe in an effort to prevent and/or minimize damage to the force sensing component caused by dirt, water, and/or collision, for example. In various instances, the force sensing component is located as far away from the walking surface as possible.

Figure 18:
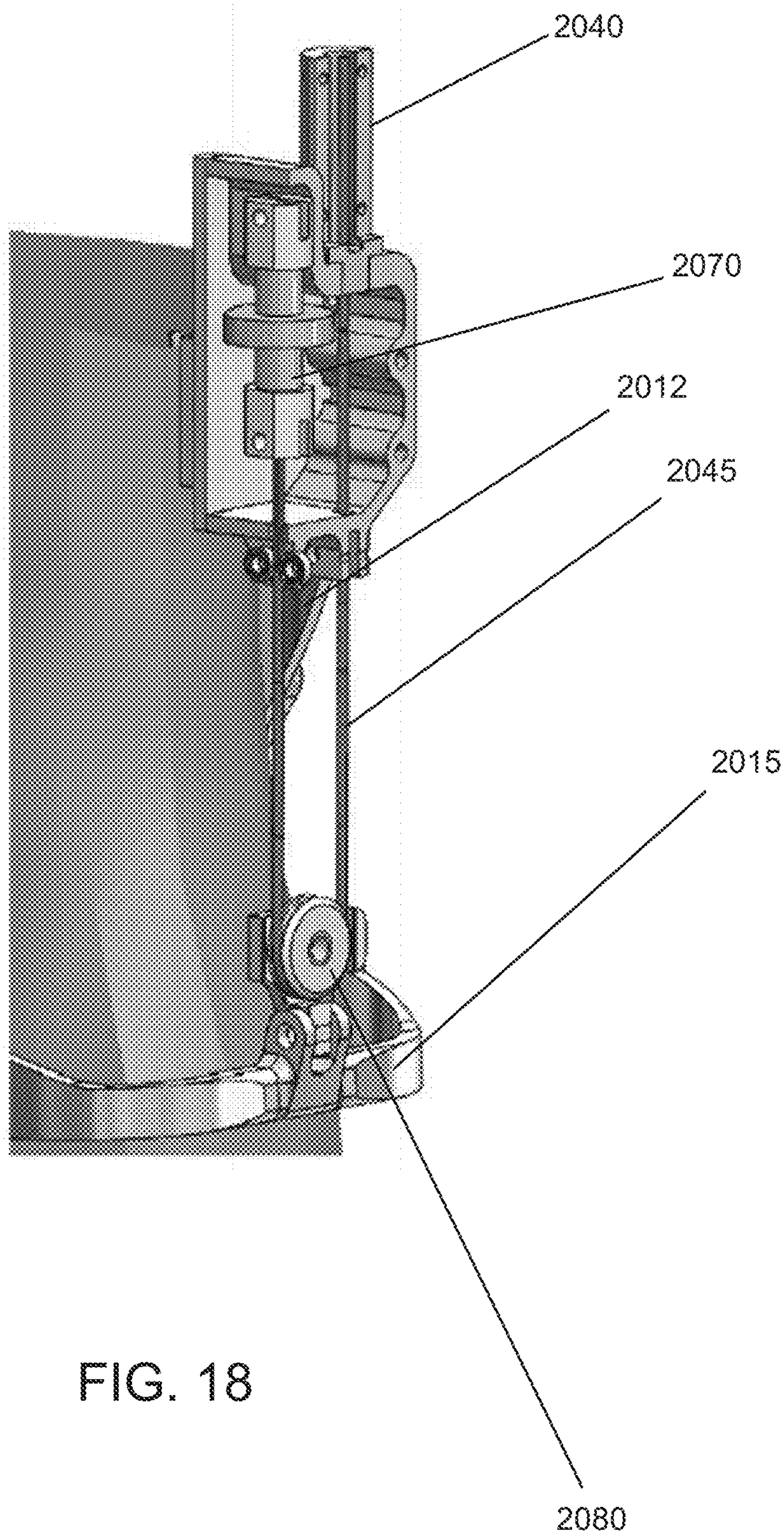
FIG. 18 is a partial perspective view of a cable configuration of the exoskeleton device of FIG. 16 according to at least one aspect of the disclosure.
Figure 19:
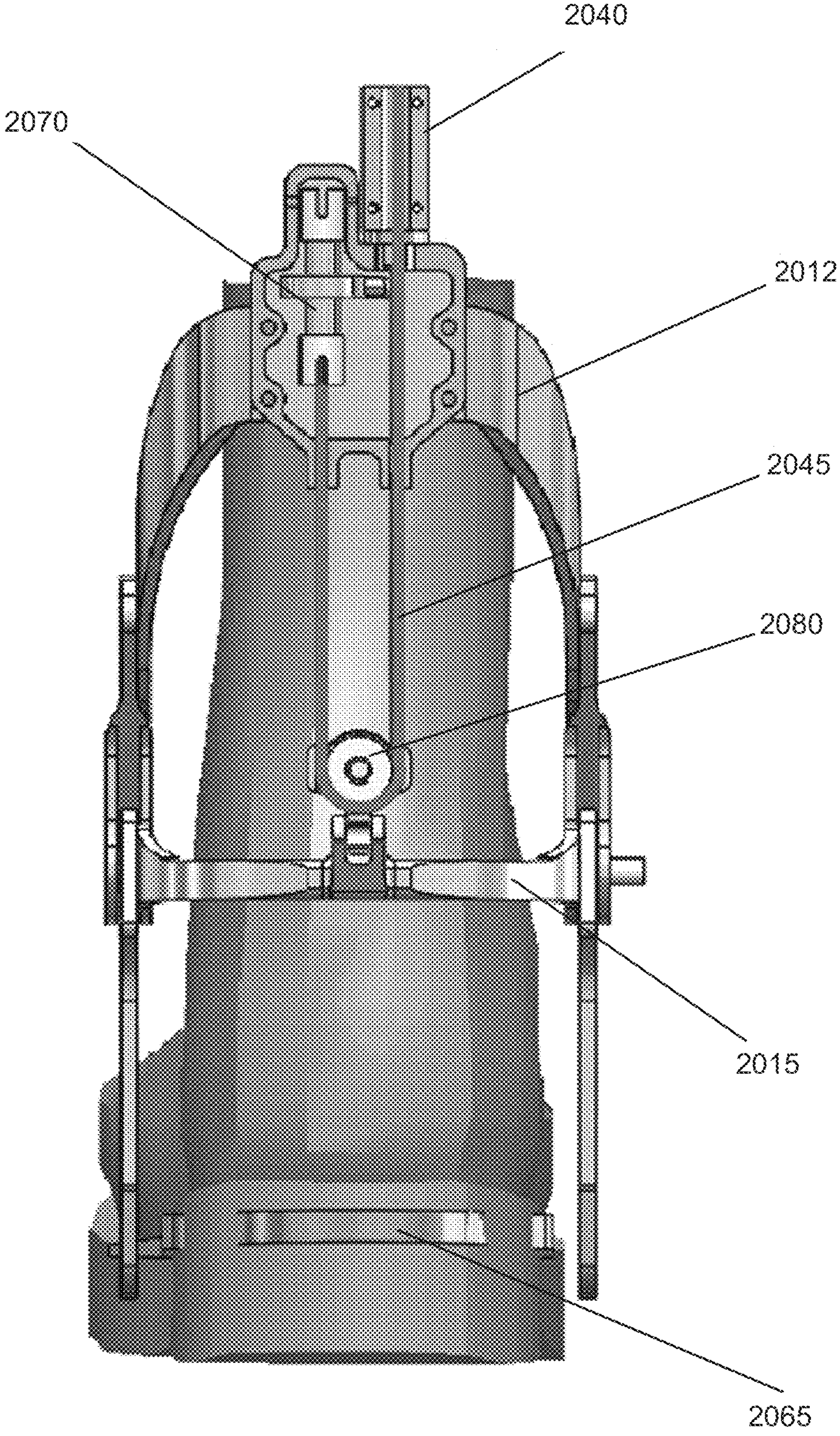
FIG. 19 is rear view of the exoskeleton device and the cable configuration of FIG. 18 according to at least one aspect of the disclosure.

One cable configuration for use with the ankle exoskeleton is shown in greater detail in FIGS. 18 and 19. As described in greater detail herein, the frame of the ankle exoskeleton comprises a shank assembly 2012 and a heel assembly 2014. The heel assembly 2014 comprises a heel lever 2015 and an attachment bracket 2075 that facilitates connection of the exoskeleton frame to the enforced midsole 2065. A pulley 2080 is positioned on the heel lever 2015. The Bowden cable conduit 2040 is connected to the shank assembly 2012. A cable 2045 from the Bowden cable conduit 2040 wraps around the pulley 2080 and extends back toward the shank assembly 2012. An end of the cable 2045 is attached to the load cell 2070 of the shank assembly 2012. Such a cable configuration has a 2:1 gear ratio to amplify pulling on the heel lever 2015. With an amplified pulling force, the heel lever 2015 can become shorter while the torque remains the same. This cable configuration further enables a more form-fitting heel lever 2015.

Figure 20:
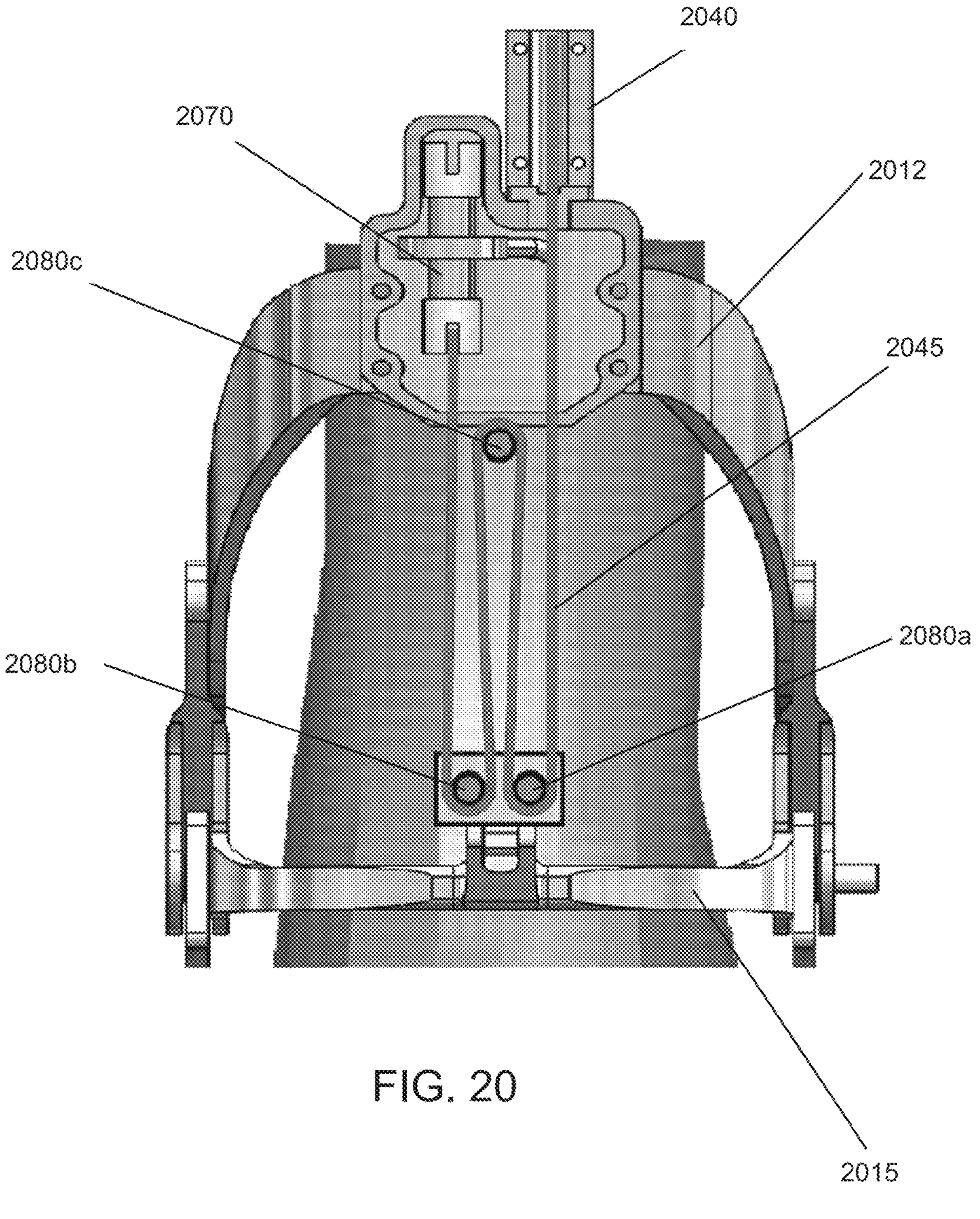
FIG. 20 is a partial rear view of an alternative cable configuration for the exoskeleton device of FIG. 16 according to at least one aspect of the disclosure.

In various instances, the ankle exoskeleton can comprise a cable configuration with "N" pulleys on the heel lever and "N−1" pulleys on the shank strut, wherein "N" is any natural number. For example, an alternative cable configuration is shown in FIG. 20. The alternative cable configuration comprises a 4:1 gear ratio. The alternative cable configuration comprises two pulleys 2080*a*, 2080*b* positioned on the heel lever 2015 and one pulley 2080*c* positioned on the shank assembly 2012. The cable 2045 from the Bowden cable conduit 2040 wraps around a first pulley 2080*a* on the heel lever 2015 and extends toward the shank assembly 2012. The cable 2045 then wraps around the pulley 2080*c* on the shank assembly 2012 and extends toward the heel lever 2015. The cable 2045 then wraps around the second pulley 2080*b* on the heel lever 2015 and extends toward the shank assembly 2012 where the cable 2045 is attached to the load cell 2070.

In various instances, the cable configuration does not comprise a pulley, such as pulley 2080. Stated another way, the cable configuration comprises zero pulleys. In such instances, the cable 2045 from the Bowden cable conduit 2040 is coupled to the heel lever 2015. In such instances, for example, the load cell 2070 is positioned on the heel lever 2015 and the cable 2045 is attached and/or otherwise coupled to the load cell 2070. The cable 2045 is configured to generate torque by pulling the heel lever 2015. As described in greater detail herein, the midsole of a shoe is releasably coupled to the heel lever 2015, and the midsole is configured to transmit force to a foot of a user.

Figure 21:
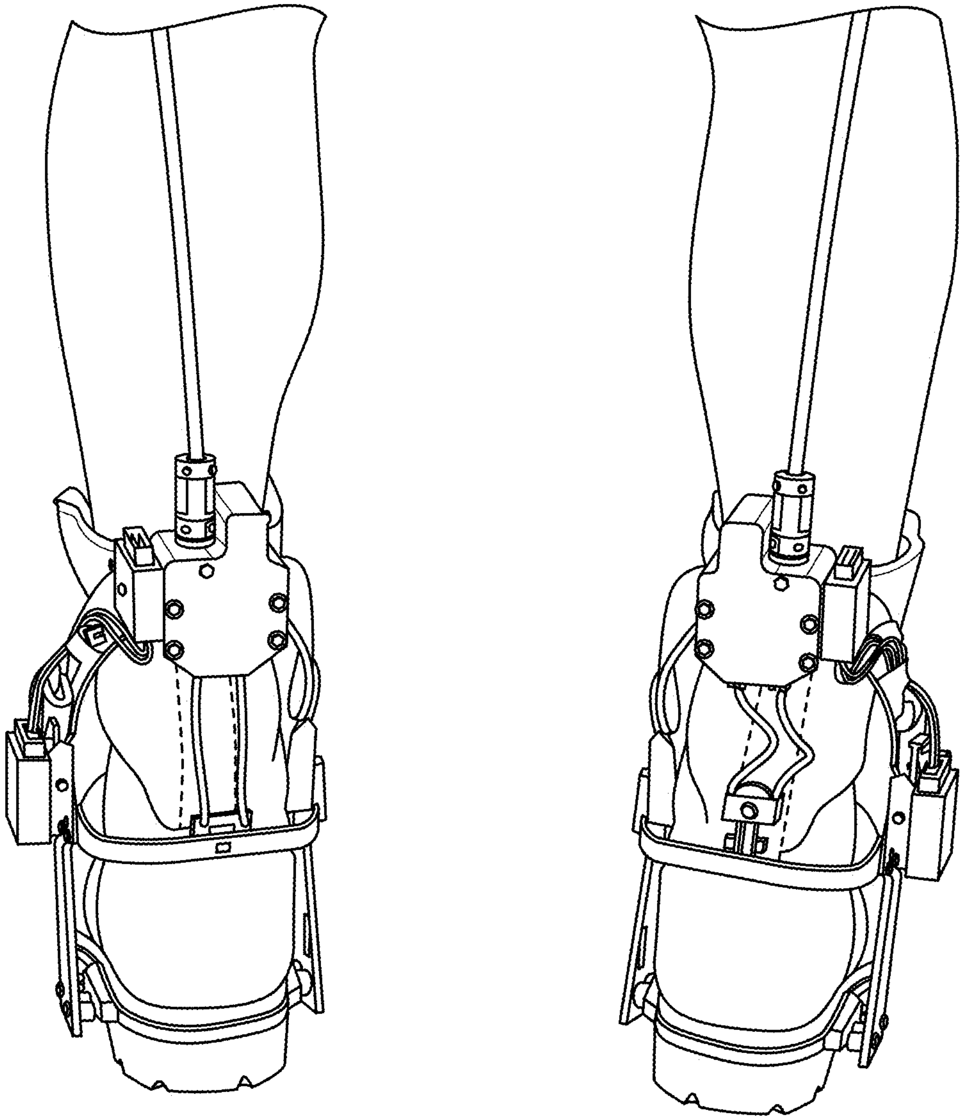
FIG. 21 is a rear view of a prototype of an ankle exoskeleton device according to at least one aspect of the disclosure.
Figure 22:
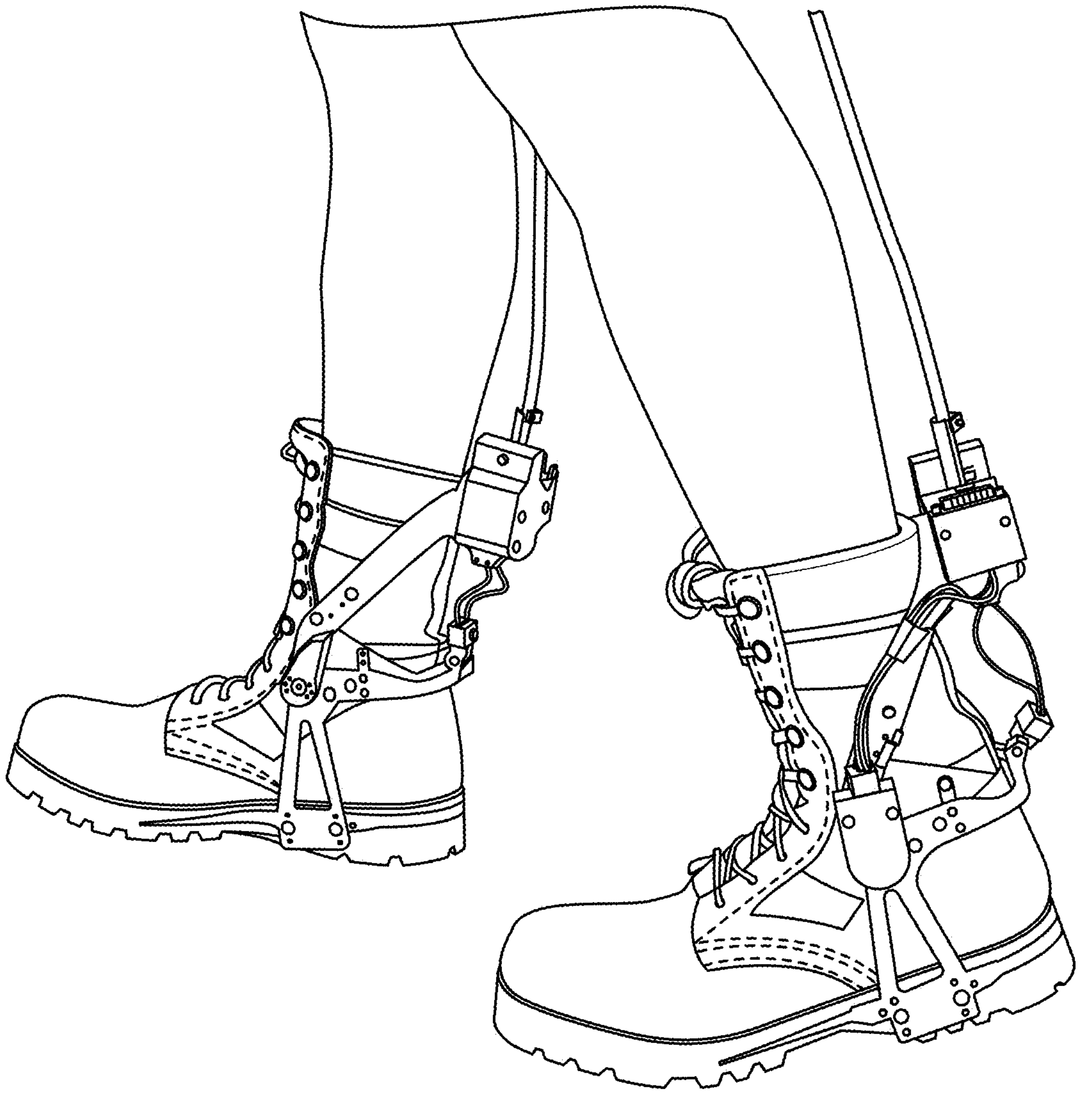
FIG. 22 is a side view of the ankle exoskeleton device prototype of FIG. 21 according to at least one aspect of the disclosure.
Figure 23:
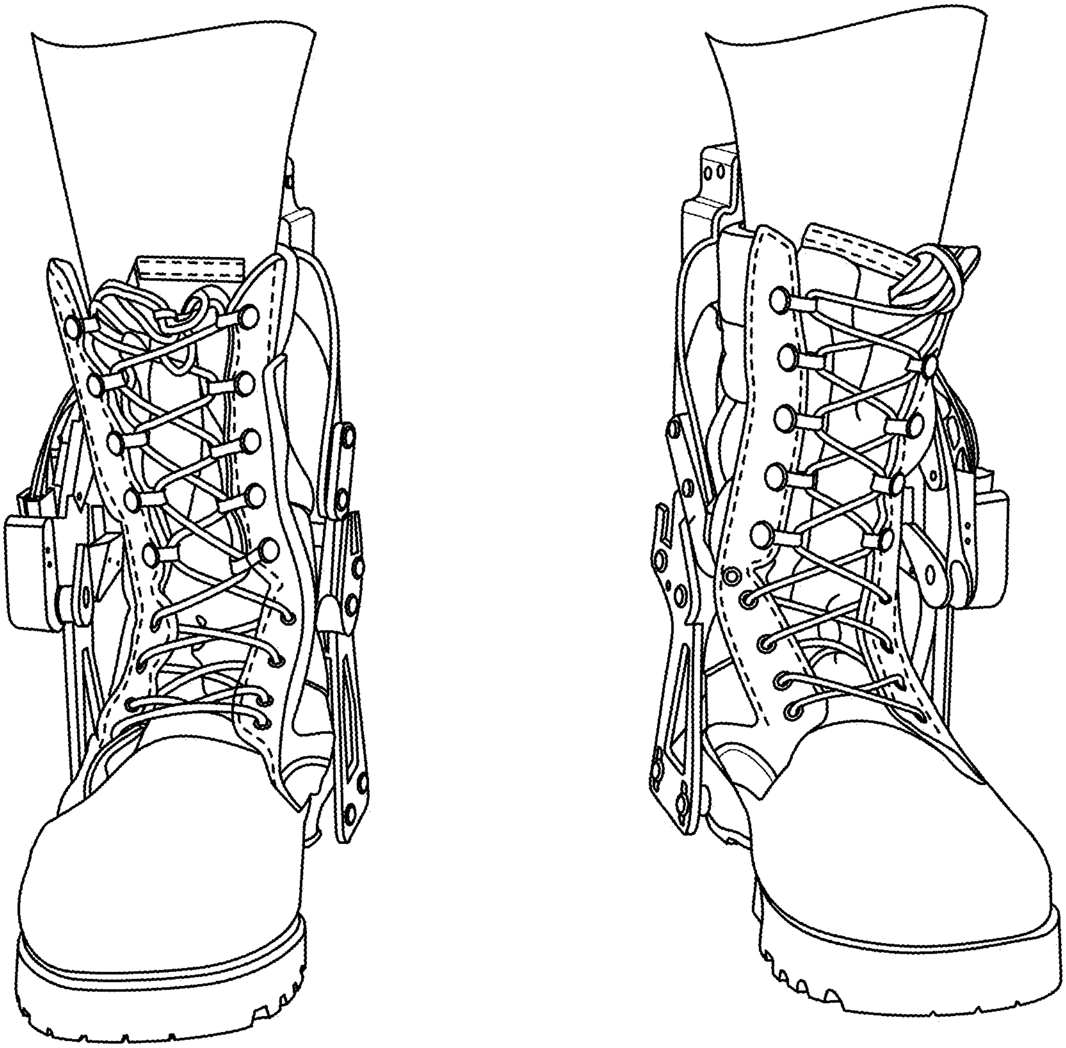
FIG. 23 is a front view of the ankle exoskeleton device prototype of FIG. 21 according to at least one aspect of the disclosure

FIGS. 21-23 display various views of a prototype of the ankle exoskeleton 2010 worn by a user.

Figure 24:
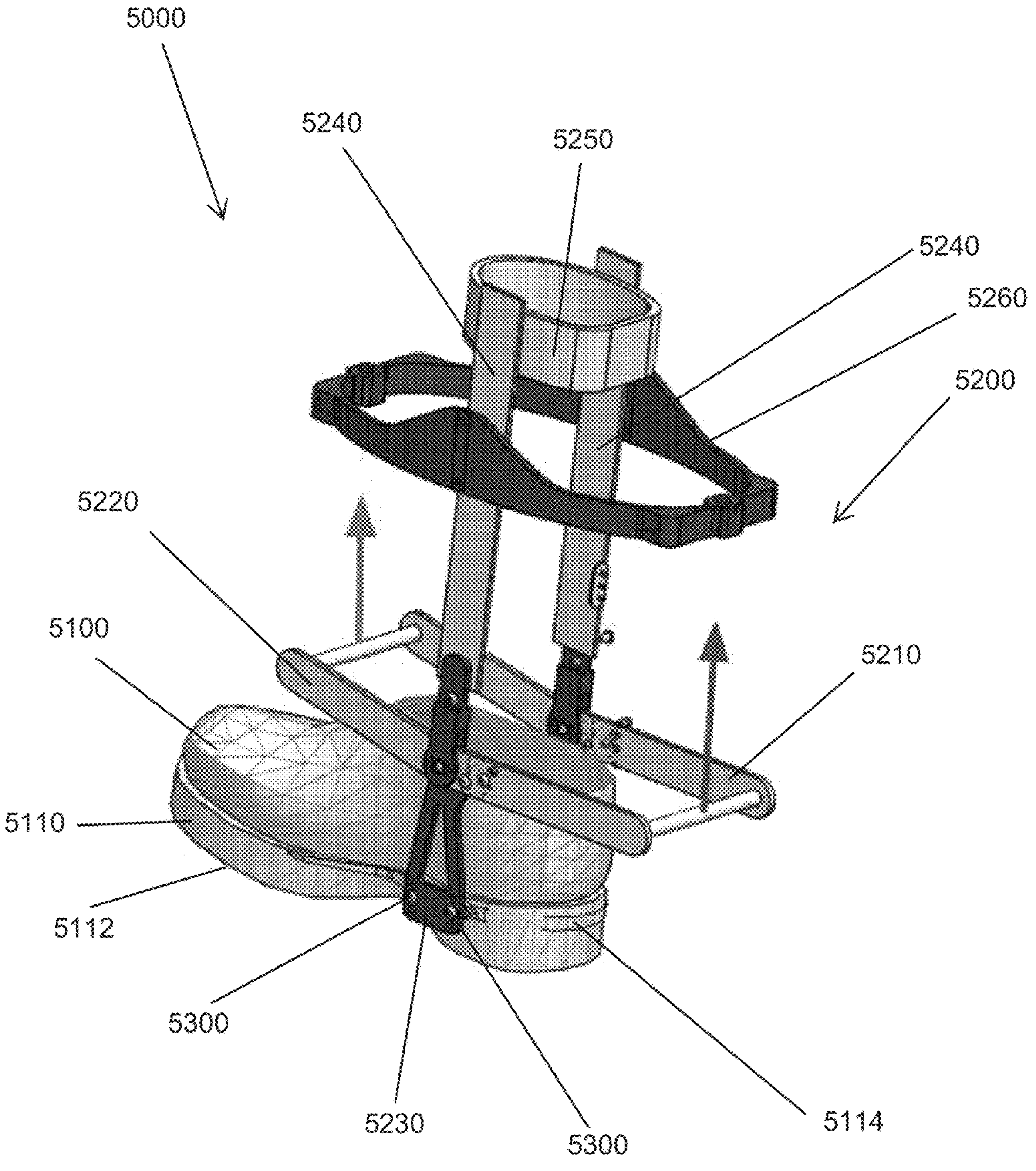
FIG. 24 is a perspective view of a device comprising an exoskeleton device releasably coupled to a boot according to at least one aspect of the disclosure.
Figure 25:
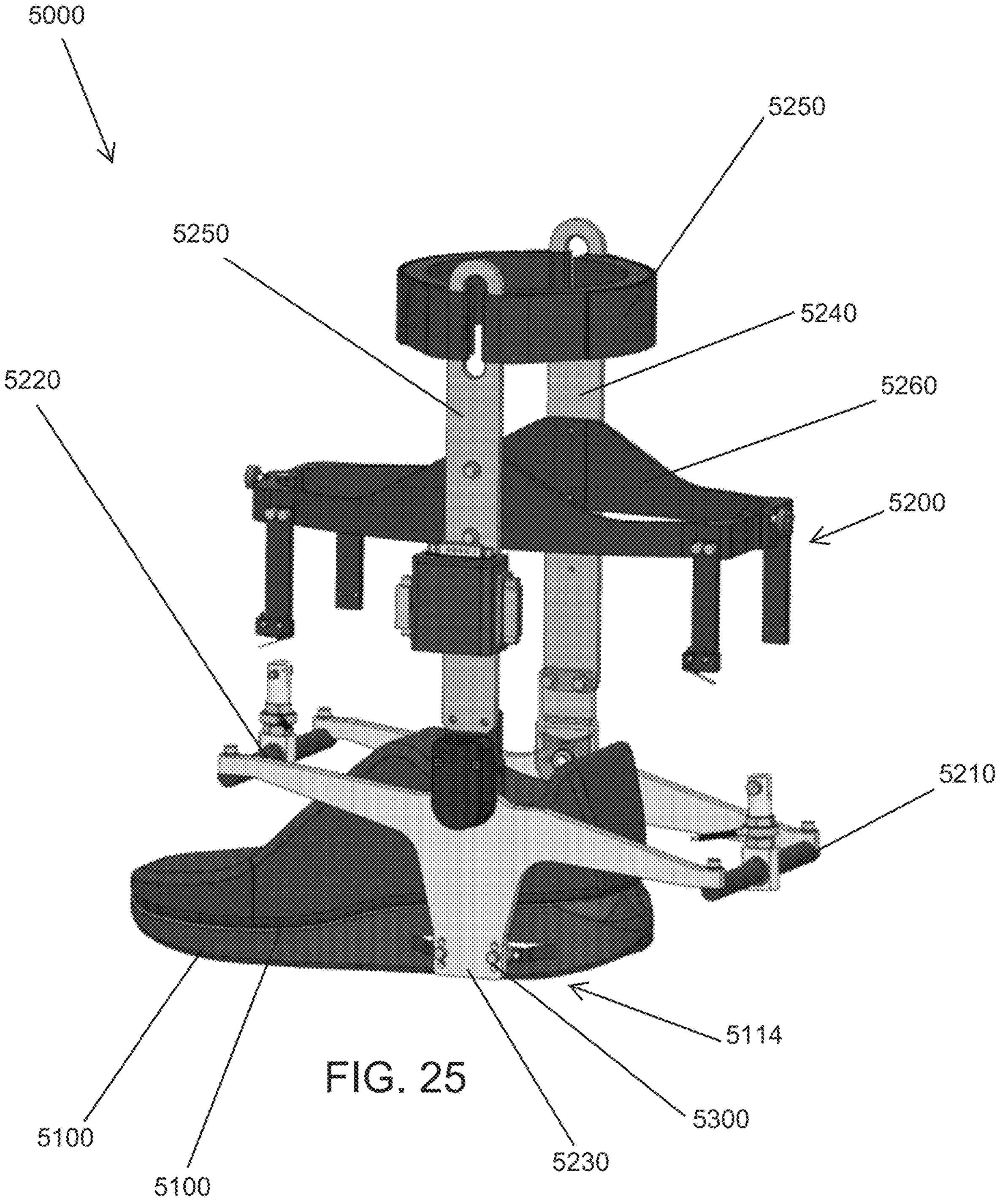
FIG. 25 is a perspective view of the device of FIG. 24 releasably coupled to an alternative tennis shoe.

FIGS. 24 and 25 illustrate a device 5000 comprising an ankle exoskeleton 5200 that is similar in many respects to ankle exoskeletons 200, 300, 2010 described herein. The ankle exoskeleton 5200 comprises supports 5240 configured to be positioned on opposite sides of a user's leg. The supports 5240 can be connected to a cuff 5250, similar to cuff 1510, configured to surround a circumference of the user's leg. The ankle exoskeleton 5200 comprises frame 5260 to which the operational components discussed with respect to ankle exoskeleton 2010 are coupled.

The ankle exoskeleton 5200 further comprises a first lever 5210, similar to lever 2015, configured to apply plantarflexion torque to an ankle joint and a second lever 5220 configured to apply dorsiflexion torque to the ankle joint. In order to achieve application of both dorsiflexion and plantarflexion torque, the ankle exoskeleton 5200 comprises two cables and sensor systems. A first pulley, such as pulleys 2080, 2080*a*, 2080*b*, is positioned on the first lever 5210. A first cable, similar to cable 2045 from Bowden cable conduit 2040, wraps around the first pulley and extends back toward the frame 5260. An end of the first cable is attached to a first force sensing component, such as load cell 2070. Similarly, a second pulley, such as pulleys 2080, 2080*a*, 2080*b*, is positioned on the second lever 5220. A second cable, similar to cable 2045 from Bowden cable conduit 2040, wraps around the second pulley and extends back toward the frame 5260. An end of the second cable is attached to a second force sensing component, such as load cell 2070. The exoskeleton 5100 can be actuated by the powerful off-board motor 2020 and the real-time controller 2030, with mechanical power transmitted through a flexible Bowden cable tether 2040.

The ability for the ankle exoskeleton 5200 to provide both dorsiflexion and plantarflexion torque serves to limit a user's range of motion and prevent the ankle joint from moving into painful angles and/or orientations. In various instances, the ankle exoskeleton 5200 comprises only the first lever 5210 and provides only plantarflexion torque, such as the ankle exoskeleton 2010. In other instances, the ankle exoskeleton 5200 comprises only the second lever 5220 and provides only dorsiflexion torque.

The ankle exoskeleton 5200 is configured to be releasably attached to a footwear 5100 such as a boot or a tennis shoe, for example. The footwear 5100 comprises a sole 5110 having an outsole 5112 and a midsole 5114. In various instances, the sole of the footwear is modified from an original composition to introduce a reinforced midsole without damaging the structural integrity of the sole. Stated another way, existing footwear can be modified for improved functionality and/or compatibility with an external device, such as the ankle exoskeleton 5200. In other instances, the original midsole of the footwear comprises a suitable level of rigidity to facilitate attachment of the external device thereto. The midsole 5114 is comprised of a material such as carbon fiber, metal, aluminum, hard plastic, and/or any combination thereof, for example.

The midsole 5114 of the footwear 5100 comprises at least one attachment interface to facilitate releasable coupling to an accessory external device, such as the ankle exoskeleton 5200. The attachment interface of the footwear 5100 can be a universal interface for coupling to numerous accessories. In various instances, the footwear 5100 comprises an attachment interface on both a lateral side and a medial side of the footwear 5100. In other instances, the attachment interface is present on only one of the lateral or medial sides of the footwear 5100. In various instances, an attachment interface is positioned on a heel of the footwear 5100. However, the footwear 5100 can have any suitable location and quantity of attachment interfaces that facilitate a secure connection between the footwear 5100 and the ankle exoskeleton 5200. The attachment interface depicted in FIGS. 24 and 25 comprises apertures defined in the midsole 5114. The apertures are sized to receive a connection means 5300, such as mounting screws, therein. The ankle exoskeleton 5200 comprises a corresponding attachment portion 5230 to the attachment interface of the footwear 5100. As shown in FIGS. 24 and 25, the attachment portion 5230 of the ankle exoskeleton 5200 comprises a mounting bracket with holes and/or apertures defined therein to receive the connection means 5300.

The attachment interface of the footwear 5100 and the attachment portion 5230 of the ankle exoskeleton 5200 can have any features and/or geometry to facilitate a releasable connection therebetween. Similarly, the connection means 5300 can comprise any form of fastener that enhance, secure, and/or maintain a suitable connection between the footwear 5100 and the ankle exoskeleton 5200 while also allowing for the footwear 5100 and the ankle exoskeleton 5200 to be readily decoupled from one another when desired. Examples of such connection means comprise, pins, screws, bolts, latches, magnets and/or any combination thereof. In various instances, the connection means comprise a press-fit, or friction-fit, relationship between the attachment interface and the attachment portion 5230.

The external device is configured to be readily decoupled from the footwear 5100. Stated another way, the connection between the footwear 5100 and the external device is able to activated and deactivated by a user, or wearer, of the footwear 5100 whenever desired. In various instances, the device 5000 comprises a quick release to decouple the external device and the footwear 5100. Such a quick release can be an independent mechanism present to disrupt the connection means holding the external device and the footwear 5100 together. The quick release can be activated by a wearer of the footwear 5100 and/or a clinician. In various instances, the quick release is automatically activated when the exoskeleton is sensed in a particular orientation and/or angle, for example.

In various instances, the footwear comprises an integrated connection means for coupling to an external device that is positioned outside of the midsole. The removal of the attachment interface from the sole of the footwear can, among other things, improve comfort for the wearer of the footwear and provide efficient energy transfer. In such instances, the physical attachment interface of the midsole and the connection means 5300 shown in FIGS. 24 and 25 are eliminated and replaced by a connection means outside of the footwear sole. In such instances, for example, the midsole can comprise a flap that extends outside of a dimension of the sole and terminates in a cuff around a wearer's calf, such as the cuff 1510. The external device can then be attached to the footwear at the cuff. In such instances, the integrated connection means is not designed to be removed from and/or independent of the footwear.

Figure 26:
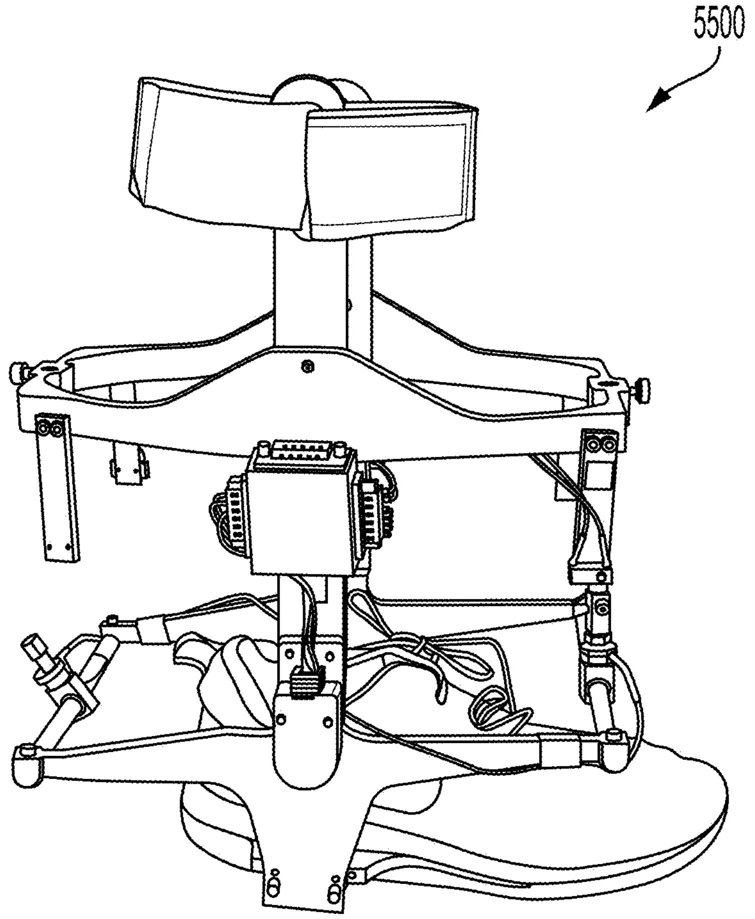
FIG. 26 is a perspective view of a prototype of the device of FIG. 25 releasably coupled to a tennis shoe.

FIG. 26 displays a perspective view of a prototype 5500 of the ankle exoskeleton 5200 worn by a user. While the footwear and external devices have been depicted and described herein primarily as boots and ankle exoskeletons, respectively, the overall assembly is intended to be a modular and/or multi-purpose platform. Stated another way, various types of external devices may be interchangeably attached to a specific type of footwear and/or various types of footwear may be interchangeably attached to a specific type of external device. Suitable footwear include, for example, boots, running shoes, dress shoes, sandals, and/or sneakers. Suitable external devices include, for example, exoskeletons, orthotics, energy harvesting generators, snowboards, roller skates, ice skates, and/or other accessories.

All of the exoskeletons described herein are modular and are configured for use with an off-board actuator, such as the Humotech Caplex Actuator Unit.

The approaches demonstrated here could also be implemented in knee and hip exoskeletons, allowing researchers to explore biomechanical interactions across joints during locomotion as well as to analyze the effect of different assistance strategies.

A number of exemplary embodiments have been described. Nevertheless, it will be understood by one of ordinary skill in the art that various modifications may be made without departing from the spirit and scope of the techniques described herein.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. An exoskeleton device, comprising:

a Bowden cable;

a shank portion comprising a strut;

a foot portion coupled to the shank portion by a rotational joint, wherein the foot portion comprises:

a lever; and a pulley attached to the lever, wherein the strut of the shank portion is configured to direct the Bowden cable toward the pulley, wherein the pulley is configured to redirect the Bowden cable back toward the shank portion, and wherein the Bowden cable is configured to generate torque by pulling the pulley; and a shoe comprising an unhinged sole insert, wherein the unhinged sole insert is inserted at least partially within a sole of the shoe, wherein the unhinged sole insert is releasably coupled to the lever, and wherein the unhinged sole insert is configured to transmit force to a foot of a user.

2. The exoskeleton device of claim 1, wherein the unhinged sole insert comprises a plate positioned between a first laver and a second layer of a sole of the shoe.

3. The exoskeleton device of claim 1, wherein the torque comprises plantarflexion torque.

4. The exoskeleton device of claim 1, wherein the torque comprises dorsiflexion torque.

5. The exoskeleton device of claim 1, wherein the foot portion is a single foot portion, wherein the torque comprises plantarflexion torque, wherein the exoskeleton device further comprises a second Bowden cable, and wherein the single foot portion further comprises:

a second lever; and a second pulley attached to the second lever, wherein the strut of the shank portion is configured to redirect the second Bowden cable toward the second pulley, wherein the second pulley is configured to redirect the Bowden cable back toward the shank portion, and wherein the Bowden cable is configured to generate dorsiflexion torque by pulling the second pulley.

6. The exoskeleton device of claim 1, further comprising a sensor configured to detect a state variable of the exoskeleton device.

7. The exoskeleton device of claim 6, further comprising:

a motor controller configured to receive the detected state variable from the sensor; and a motor communicatively coupled to the motor controller, wherein the motor is configured to cause the Bowden cable to provide the torque about the rotational joint in response to a motor control signal sent by the motor controller.

8. The exoskeleton device of claim 6, wherein the detected state variable is a force measurement.

9. The exoskeleton device of claim 8, wherein the force measurement comprises the tension of the Bowden cable.

10. The exoskeleton device of claim 6, wherein the detected state variable is an angle measurement.

11. The exoskeleton device of claim 10, wherein the angle measurement comprises the angle of the shank portion relative to the foot portion.

12. The exoskeleton device of claim 6, wherein the sensor comprises a load cell, and wherein the load cell is attached to the shank portion.

13. The exoskeleton device of claim 6, wherein the detected state variable comprises a force measurement and an angle measurement.

14. The exoskeleton device of claim 13, wherein a value of the torque is computed as a function of a value of the force measurement and a value of the angle measurement.

15. The exoskeleton device of claim 1, further comprising a second shoe comprising a second unhinged sole insert, wherein the second unhinged sole insert is configured to be releasably coupled to the lever in lieu of the unhinged sole insert, and wherein the second shoe is different than the shoe.

16. The exoskeleton device of claim 1, further comprising a second pulley attached to the shank portion and a third pulley attached to the lever, wherein the pulley is configured to redirect the Bowden cable toward the second pulley, wherein the second pulley is configured to redirect the Bowden cable back toward the third pulley, and wherein the third pulley is configured to redirect the Bowden cable back toward the shank portion.

17. An exoskeleton device, comprising:

a Bowden cable;

a shank portion comprising a strut;

a foot portion coupled to the shank portion by a rotational joint, wherein the foot portion comprises a lever, wherein the strut of the shank portion is configured to direct the Bowden cable toward the lever, and wherein the Bowden cable is configured to generate torque by pulling the lever; and a shoe comprising an unhinged sole insert, wherein the unhinged sole insert is at least partially incorporated into a sole of the shoe, wherein the unhinged sole insert is releasably coupled to the lever, and wherein the unhinged sole insert is configured to transmit force to a foot of a user.

18. The exoskeleton device of claim 17, further comprising a sensor configured to detect a state variable of the exoskeleton device, wherein the sensor comprises a load cell, and wherein the load cell is attached to the lever.

19. A modular device, comprising:

an exoskeleton device;

an external mechanical device, wherein the external mechanical device is different than the exoskeleton device;

a shoe comprising a sole and a reinforced, unhinged sole insert, wherein the reinforced, unhinged sole insert is positioned between an inner layer and an outer layer of the sole of the shoe; and connection means for interchangeably connecting the reinforced, unhinged sole insert to the exoskeleton device and the external mechanical device.

20. The modular device of claim 19, wherein the connection means is integrated with the reinforced, unhinged sole insert.

* * * * *